United States Patent
Kondo et al.

(10) Patent No.: US 10,620,131 B2
(45) Date of Patent: Apr. 14, 2020

(54) DETECTION APPARATUS AND DETECTION METHOD

(71) Applicant: Mitsubishi Electric Corporation, Chiyoda-ku, Tokyo (JP)

(72) Inventors: Junji Kondo, Tokyo (JP); Hiroyuki Tsutada, Tokyo (JP); Megumi Irie, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/576,096

(22) PCT Filed: Nov. 2, 2015

(86) PCT No.: PCT/JP2015/080942
§ 371 (c)(1),
(2) Date: Nov. 21, 2017

(87) PCT Pub. No.: WO2016/189764
PCT Pub. Date: Dec. 1, 2016

(65) Prior Publication Data
US 2018/0156736 A1    Jun. 7, 2018

(30) Foreign Application Priority Data
May 26, 2015   (JP) .................. 2015-106782

(51) Int. Cl.
*G01N 21/88*  (2006.01)
*G06T 7/73*  (2017.01)
*G06T 7/00*  (2017.01)

(52) U.S. Cl.
CPC ......... *G01N 21/8851* (2013.01); *G01N 21/88* (2013.01); *G06T 7/0002* (2013.01);
(Continued)

(58) Field of Classification Search
CPC .............. G01N 21/8851; G01N 21/88; G01N 2021/8896; G06T 7/73; G06T 7/0008;
(Continued)

(56) References Cited

U.S. PATENT DOCUMENTS 5,416,412 A * 5/1995 Slayman ............... G01R 33/583
324/309
5,426,506 A * 6/1995 Ellingson ............... G01N 21/88
250/225

(Continued)

FOREIGN PATENT DOCUMENTS

JP   62-215854 A   9/1987
JP   3-160349 A   7/1991
(Continued)

OTHER PUBLICATIONS

Espacenet English Translation of Description of JP2007327848.*
(Continued)

*Primary Examiner* — Mohamed K Amara
(74) *Attorney, Agent, or Firm* — Buchanan Ingersoll & Rooney PC

(57) ABSTRACT

A detection apparatus improves abnormality detection accuracy after start of an inspection operation while reducing the amount of work that is done before the start of the operation. The apparatus includes an object characteristic storage device that stores a parameter indicating a characteristic of an abnormal object, an object detection unit that detects an abnormal object candidate from image information by using the parameter, an object storage unit that stores the abnormal object candidate, an object display unit that displays the abnormal object candidate stored in the object storage unit, a calibration input unit that receives input of calibration information on the abnormal object candidate, and, based on the calibration information, corrects the abnormal object candidate stored in the object storage unit, and an object (Continued)

characteristic calibration unit that calibrates the parameter stored in the object characteristic storage device, based on the calibration information received by the calibration input unit.

23 Claims, 15 Drawing Sheets

(52) U.S. Cl.
CPC .............. *G06T 7/0008* (2013.01); *G06T 7/73* (2017.01); *G06T 7/75* (2017.01); *G01N 2021/8896* (2013.01); *G06T 2207/10024* (2013.01); *G06T 2207/20092* (2013.01)

(58) Field of Classification Search
CPC ................ G06T 7/0002; G06T 7/75; G06T 2207/20092; G06T 2207/10024
See application file for complete search history.

(56) References Cited

U.S. PATENT DOCUMENTS

| | | | | |
|---|---|---|---|---|
| 5,710,631 | A * | 1/1998 | Bou-Ghannam | G01N 21/88 356/495 |
| 5,963,662 | A * | 10/1999 | Vachtsevanos | G01N 21/88 250/332 |
| 6,615,648 | B1 * | 9/2003 | Ferguson | G01C 7/04 702/127 |
| 6,819,786 | B2 * | 11/2004 | Hirai | G06T 7/0002 382/132 |
| 7,518,632 | B2 * | 4/2009 | Konomura | G01N 21/954 348/45 |
| 7,965,414 | B2 * | 6/2011 | Wu | H04N 1/60 358/1.9 |
| 7,995,804 | B2 * | 8/2011 | Steinberg | G06K 9/00228 345/589 |
| 8,126,218 | B2 * | 2/2012 | Nanu | G06K 9/0061 348/207.1 |
| 8,351,683 | B2 * | 1/2013 | Yamashita | G01N 21/9501 356/237.4 |
| 8,493,478 | B2 * | 7/2013 | DeLuca | G06K 9/0061 348/241 |
| 8,532,949 | B2 | 9/2013 | Teh et al. | |
| 8,628,906 | B2 * | 1/2014 | Thaler | G03G 9/0926 430/114 |
| 9,488,592 | B1 * | 11/2016 | Maresca | G01N 21/8851 |
| 9,858,673 | B2 * | 1/2018 | Ciurea | H04N 13/232 |
| 9,892,504 | B2 * | 2/2018 | Kotake | G01N 21/956 |
| 2002/0037099 | A1 * | 3/2002 | Ogawa | G06T 7/0002 382/149 |
| 2003/0053676 | A1 * | 3/2003 | Shimoda | G01N 21/95684 382/145 |
| 2004/0183900 | A1 * | 9/2004 | Karpen | G01N 21/8803 348/92 |
| 2005/0074140 | A1 * | 4/2005 | Grasso | G06T 5/00 382/103 |
| 2006/0078193 | A1 * | 4/2006 | Brummel | G01N 21/8806 382/152 |
| 2006/0082763 | A1 | 4/2006 | Teh et al. | |
| 2006/0133661 | A1 * | 6/2006 | Takeda | G01N 21/95607 382/149 |
| 2006/0233442 | A1 * | 10/2006 | Lu | G06K 9/00711 382/190 |
| 2007/0217672 | A1 * | 9/2007 | Shannon | G06T 7/0006 382/152 |
| 2008/0032429 | A1 * | 2/2008 | Chen | G01N 21/8851 438/14 |
| 2008/0292176 | A1 | 11/2008 | Sakai et al. | |
| 2009/0034828 | A1 * | 2/2009 | Ferro | G01N 29/0645 382/144 |
| 2009/0109230 | A1 * | 4/2009 | Miller | G06F 1/3203 345/506 |
| 2010/0188486 | A1 * | 7/2010 | Amanullah | G01N 21/8806 348/48 |
| 2010/0239124 | A1 * | 9/2010 | Hazeyama | G06T 7/11 382/103 |
| 2010/0283847 | A1 * | 11/2010 | Aikawa | G01N 21/8803 348/142 |
| 2011/0262026 | A1 | 10/2011 | Hori | |
| 2011/0274362 | A1 | 11/2011 | Isomae et al. | |
| 2012/0092656 | A1 * | 4/2012 | Nakao | G01N 21/8851 356/237.3 |
| 2013/0242354 | A1 * | 9/2013 | Dewancker | H04N 1/40 358/448 |
| 2014/0270397 | A1 * | 9/2014 | Sochi | G06T 7/001 382/112 |
| 2014/0321712 | A1 * | 10/2014 | Ciurea | H04N 13/232 382/106 |
| 2014/0341437 | A1 * | 11/2014 | Araki | G06T 7/001 382/112 |
| 2015/0015874 | A1 * | 1/2015 | Chen | G01N 21/8806 356/237.1 |
| 2015/0332452 | A1 * | 11/2015 | Tsuchiya | G06T 7/0004 382/147 |
| 2016/0283821 | A1 * | 9/2016 | Abhau | G06K 9/52 |
| 2018/0195973 | A1 * | 7/2018 | Yonekawa | E01C 23/01 |
| 2018/0293732 | A1 * | 10/2018 | Oki | G06T 7/11 |
| 2019/0156145 | A1 * | 5/2019 | Pourian | G06K 9/6211 |

FOREIGN PATENT DOCUMENTS

| | | | |
|---|---|---|---|
| JP | 2001-286827 A | 10/2001 | |
| JP | 2002-310920 A | 10/2002 | |
| JP | 2003-57218 A | 2/2003 | |
| JP | 2004-347585 A | 12/2004 | |
| JP | 2007-327848 A | 12/2007 | |
| JP | 2008-89574 A | 4/2008 | |
| JP | 2008/286586 A | 11/2008 | |
| JP | 2010-19618 A | 1/2010 | |
| JP | 2011-232111 A | 11/2011 | |
| JP | 2014-9970 A | 1/2014 | |
| JP | 2014-159981 A | 9/2014 | |
| JP | 2015-137919 A | 7/2015 | |
| WO | WO-2012002012 A1 * | 1/2012 | ......... A61B 1/00009 |
| WO | WO 2014/208257 A1 | 12/2014 | |

OTHER PUBLICATIONS

International Search Report (PCT/ISA/210) dated Jan. 26, 2016, by the Japanese Patent Office as the International Searching Authority for International Application No. PCT/JP2015/080942.
Written Opinion (PCT/ISA/237) dated Jan. 26, 2016, by the Japanese Patent Office as the International Searching Authority for International Application No. PCT/JP2015/080942.
Extended European Search Report dated Mar. 8, 2018, issued by the European Patent Office in corresponding European Application No. 15893396.0. (7 pages).
Office Action dated Jul. 29, 2019, by the State Intellectual Property Office of People's Republic of China, in corresponding Chinese Patent Application No. 201580080128.6 and English translation of the Office Action. (30 pages).
European Communication dated Jan. 22, 2020 issued by the European Patent Office in European Application No. 15893396.0 (5 Pages).

* cited by examiner

FIG.6
(a) CRACK CANDIDATE
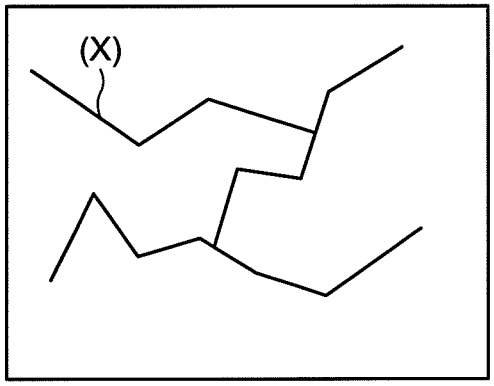
(b) ABNORMAL PORTION PROVIDED BY HAMMERING TEST
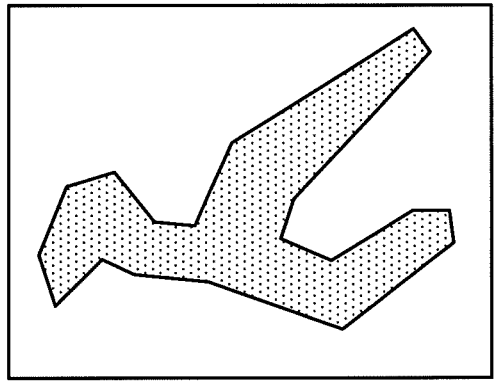
(c) SUPERIMPOSED DISPLAY
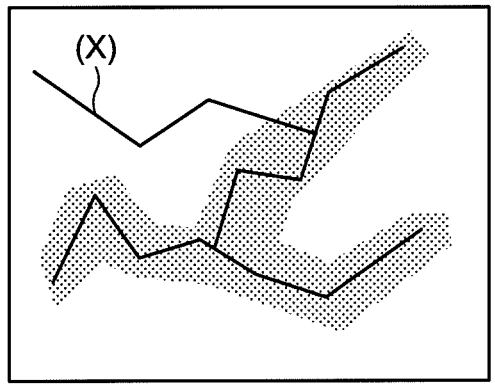
(d) CONTENT OF CALIBRATION DETERMINED
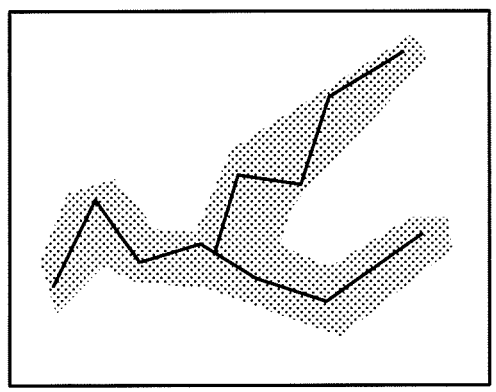

DETECTION APPARATUS AND DETECTION METHOD

FIELD

The present invention relates to a detection apparatus for detecting abnormalities of objects to be detected, and a detection method for detecting the abnormalities.

BACKGROUND

There has been a technique of receiving a plurality of sample images as input information to learn characteristics of objects to be inspected and, on the basis of the results of the learning, detect abnormalities occurring at the objects. Patent Literature 1 below discloses an inspection auxiliary apparatus for detecting a defect such as looseness of a bolt used in a pylon. The apparatus learns beforehand the characteristics of the object by using a large amount of the sample images.

CITATION LIST

Patent Literature

Patent Literature 1: Japanese Patent Application Laid-open No. 2014-159981

SUMMARY

Technical Problem

However, the above conventional technique suffers from a problem of great effort being required to beforehand learn the characteristics of the object from a large amount of the correct sample images in order to correctly learn the characteristics of the object. The conventional technique also suffers from a problem of failure to improve the accuracy of detection of the defect because the contents learned cannot be corrected after the start of the inspection operation.

The present invention has been made in view of the above, and has an object of the present invention is to provide a detection apparatus capable of improving the detection accuracy of the abnormalities after the start of the inspection operation while reducing the amount of work that is done before the start of the inspection operation.

Solution to Problem

To solve the above problem and achieve the object, the present invention provides a detection apparatus comprising: an object characteristic storage device to store a parameter indicating a characteristic of an abnormal object; an object detection unit to detect an abnormal object candidate from image information by using the parameter; an object storage unit to store the abnormal object candidate; an object display unit to display the abnormal object candidate stored in the object storage unit; a calibration input unit to receive input of calibration information on the abnormal object candidate, and, on a basis of the calibration information, correct the abnormal object candidate stored in the object storage unit; and an object characteristic calibration unit to calibrate the parameter stored in the object characteristic storage device, on the basis of the calibration information received by the calibration input unit.

Advantageous Effects of Invention

The present invention achieves the effect of improving the detection accuracy of the abnormalities after the start of the inspection operation while reducing the amount of work that is done before the start of the inspection operation.

BRIEF DESCRIPTION OF DRAWINGS

FIG. 6 is a diagram illustrating an example of a method for calibrating a crack candidate by the detection apparatus according to the fourth embodiment.

DESCRIPTION OF EMBODIMENTS

Hereinafter, a detection apparatus and a detection method according to embodiments of the present invention will be described in detail with reference to the drawings. The embodiments are not intended to limit the invention.

First Embodiment

Figure 1:
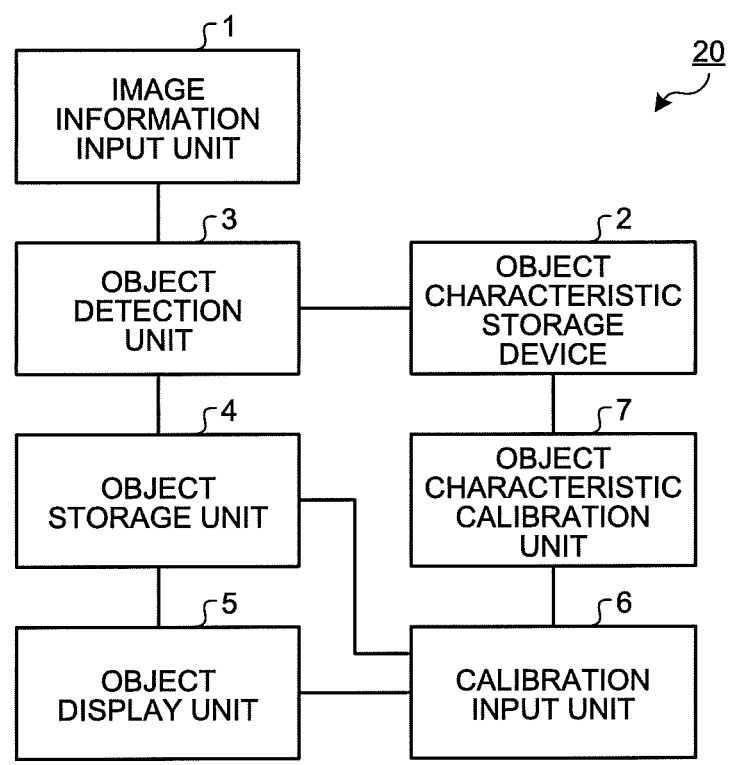
FIG. 1 is a block diagram illustrating a configuration example of a detection apparatus according to a first embodiment.

FIG. 1 is a block diagram illustrating a configuration example of a detection apparatus 20 according to a first embodiment of the present invention. The detection apparatus 20 includes an image information input unit 1, an object characteristic storage device 2, an object detection unit 3, an object storage unit 4, an object display unit 5, a calibration input unit 6, and an object characteristic calibration unit 7. The image information input unit 1 receives input of image information on an abnormal object to be detected. The object characteristic storage device 2 stores a parameter indicating the characteristic of an abnormal object. The object detection unit 3 detects an abnormal object candidate from the image information by using the parameter indicating the characteristic of the abnormal object. The object storage unit 4 stores the detected abnormal object candidate. The object display unit 5 displays the abnormal object candidate stored in the object storage unit 4. The calibration input unit 6 receives input of calibration information on the abnormal object candidate displayed on the object display unit 5, and, on the basis of the calibration information, corrects the abnormal object candidate stored in the object storage unit 4. The object characteristic calibration unit 7 calibrates the parameter indicating the characteristic of the abnormal object stored in the object characteristic storage device 2, on the basis of the calibration information received by the calibration input unit 6.

Abnormalities means a concrete surface condition different from proper conditions including a regularly uneven surface, a uniform surface pattern, and a flat surface. In an example of application for concrete integrity diagnostics, the abnormalities may be cracks, soil, deposits, leak sites, honeycombs that are areas where concrete aggregate is unevenly distributed, joints, and cold joints caused by failure to pour concrete. However, when no other than cracks need not be detected for the integrity diagnostics, in some case, only cracks are judged to be abnormalities, and concrete surfaces having abnormalities other than cracks are judged to be in proper conditions. Strict definition of abnormalities depends on the applications. In the present embodiment, abnormal objects to be detected are cracks. Specifically, descriptions of embodiments of the present invention are directed to detection of cracks occurring in a structure such as a tunnel. Abnormal objects to be detected are not limited to cracks. The present embodiment can be applied to all of existing objects to be detected in image processing as a whole, including concrete surface abnormal conditions such as honeycombs, leak sites, and soil, and concrete surface conditions such as joints.

The image information input unit 1 receives input of image information on an object such as tunnel to be inspected. The image information is digitally taken by a digital camera or the like, and can be image-processed by a computer. The image information input unit 1 may be a digital camera itself, or may be a data reader that reads data on the image information taken by a digital camera or the like via a storage medium, or a communication device that receives through wire communication or wireless communication the image information taken by a digital camera or the like.

The object characteristic storage device 2 stores various parameters indicating the characteristic of an abnormal object to be detected. When the detection apparatus 20 detects cracks, the object characteristic storage device 2 stores parameters indicating what color is similar to the color of a crack, crack thickness variation, and luminance difference from the surroundings of a crack.

The parameters stored in the object characteristic storage device 2 are information used by the object detection unit 3 to make a determination in detecting cracks. For example, the object characteristic storage device 2 stores, as a parameter, a threshold set by an intensity gradient when an image of an object to be inspected is converted into a black and white image by gray-scale image processing.

As to image information input from the image information input unit 1, the object detection unit 3 refers to a parameter stored in the object characteristic storage device 2, thereby detecting from the image information a crack candidate that is a candidate for a crack. For example, when an intensity gradient threshold in gray scale display is stored in the object characteristic storage device 2 as described above, the object detection unit 3 converts the image information input from the image information input unit 1 into a gray scale. When the gray-scale image includes a location having an intensity gradient higher than or equal to the threshold, such a location is detected as a crack candidate. A method of detecting a crack candidate on the basis of the intensity gradient threshold is an example, and the object detection unit 3 may alternatively use, in combination, various parameters stored in the object characteristic storage device 2 to detect a crack candidate from image information input from the image information input unit 1. The object detection unit 3 stores information on the detected crack candidate in the object storage unit 4.

The object storage unit 4 stores the crack candidate detected by the object detection unit 3. The crack candidate stored in the object storage unit 4 is, for example, information provided by an image identifying the location of a crack in image information input from the image information input unit 1, information showing the shape of a crack by a Bezier curve, information showing the shape of a crack by a spline curve, or the like, but is not limited to them.

The object display unit 5 refers to the object storage unit 4, and displays, in a visible form, the crack candidate stored in the object storage unit 4. For example, the object display unit 5 displays the crack candidate, for example, on a display of a personal computer of the detection apparatus 20, or on a head-mounted display worn by a user who is an inspector performing crack inspection.

The calibration input unit 6 receives, from a user who has viewed the crack candidate displayed on the object display unit 5, input of a crack candidate judgment on whether the displayed crack candidate is an object which the user desires to detect. Although the object display unit 5 displays the crack candidate detected by the object detection unit 3, the object detection unit 3 can fail to detect all cracks correctly. This case is where a location that is not a crack is detected by the object detection unit 3 as a crack candidate, or where the object detection unit 3 fails to detect a location having a crack, as a crack candidate. The user inputs, via the calibration input unit 6, the mark "○" or "x" for the crack candidate displayed on the object display unit 5. For example, the user inputs the mark "○" for a location where a crack is displayed correctly, and "x" for a location where a crack is not displayed correctly. The user also inputs, via the calibration input unit 6, "OK" or the like for the crack candidate displayed on the object display unit 5 when the user has judged that all cracks have been detected correctly. The calibration input unit 6 outputs, to the object characteristic calibration unit 7, calibration information that is information such as "○," "x," or "OK" input by a user. On the basis of the calibration information such as "○", "x," or "OK", the calibration input unit 6 corrects the crack candidate stored in the object storage unit 4. Components for receiving input of calibration information from a user at the calibration input unit 6 include a mouse and a keyboard used with a personal computer, a touch panel of a mobile terminal, and a pen tablet, but are not limited to them. The calibration input unit 6 has a storage unit that temporarily stores calibration information received from a user.

On the basis of the calibration information input at the calibration input unit 6, the object characteristic calibration unit 7 calibrates the parameter stored in the object characteristic storage device 2 so that the object detection unit 3 avoids detecting a location which the object detection unit 3 has erroneously detected although this location is not a crack, or so that the object detection unit 3 can detect a location which the object detection unit 3 has failed to detect although this location is a crack. For example, when the object detection unit 3 has erroneously detected the location although the location is not a crack, the object characteristic calibrator 7 performs calibration to increase the above-described intensity gradient threshold that is the parameter stored in the object characteristic storage device 2. On the other hand, when the object detection unit 3 has failed to detect the location although the location is a crack, the object characteristic calibrator 7 performs calibration to decrease the above-described intensity gradient threshold that is the parameter stored in the object characteristic storage device 2. When "OK" is input at the calibration input unit 6, the object characteristic calibration unit 7 does not calibrate the parameter stored in the object characteristic storage device 2.

Figure 2:
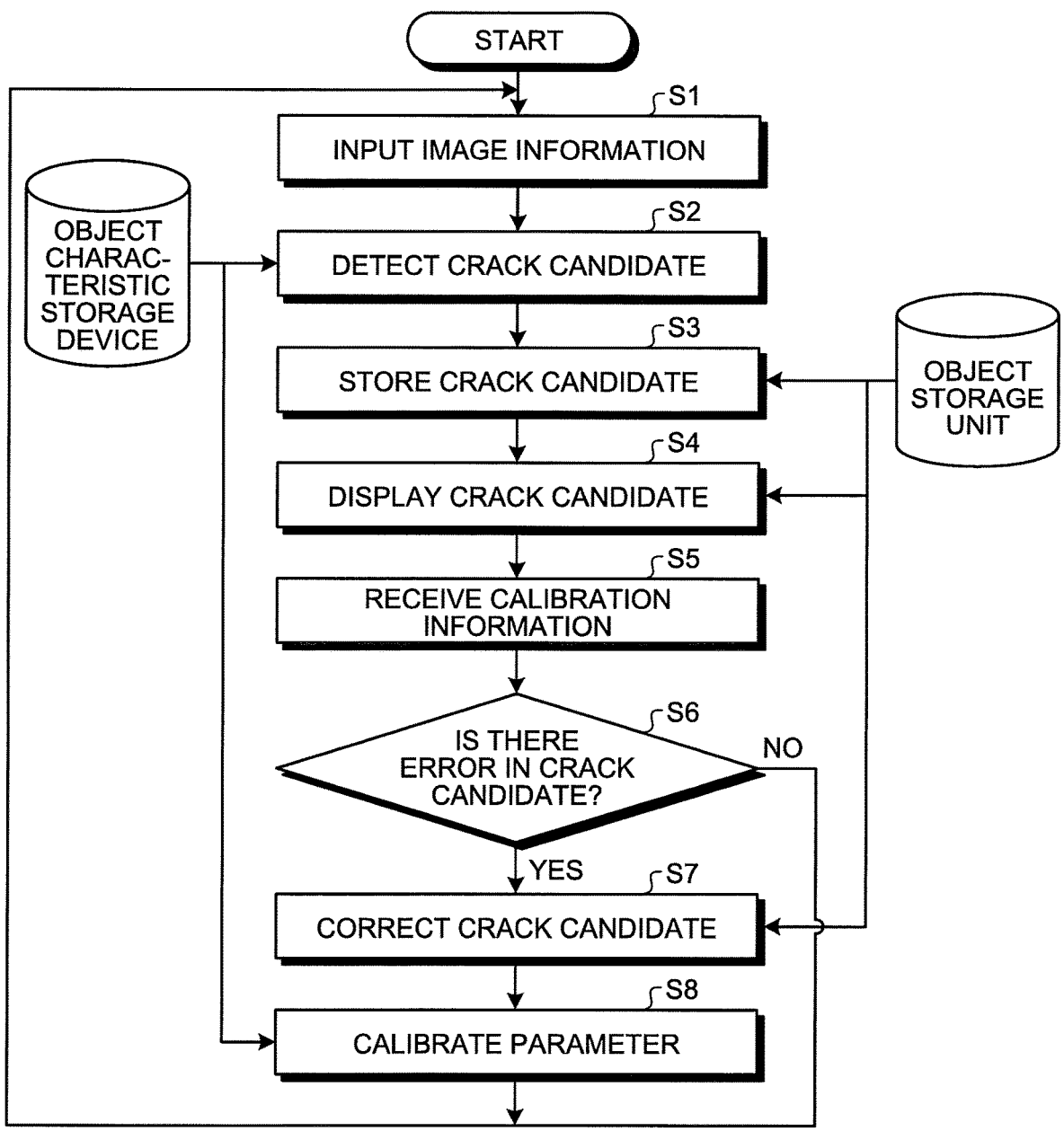
FIG. 2 is a flowchart illustrating crack candidate detection processing in the detection apparatus according to the first embodiment.

Next, a description is made as to a detection method for detecting abnormalities by the detection apparatus 20, specifically as to a flowchart of crack candidate detection processing. More specifically, a process of detecting cracks occurring in a surface of a concrete tunnel during the inspection of the tunnel is described below. FIG. 2 is a flowchart illustrating crack candidate detection processing in the detection apparatus 20 according to the first embodiment. The parameter is set in the object characteristic storage device 2 of the detection apparatus 20 so that the object detection unit 3 can use the parameter stored in the object characteristic storage device 2.

First, image information on a tunnel surface taken by a digital camera or the like is input to the image information input unit 1 of the detection apparatus 20 (step S1). The object detection unit 3 detects a crack candidate from the image information input from the image information input unit 1, by using a parameter stored in the object characteristic storage device 2, the parameter indicating a characteristic of a crack that is an abnormal object (step S2). The object detection unit 3 stores the detected crack candidate in the object storage unit 4 (step S3).

The object display unit 5 displays the crack candidate stored in the object storage unit 4 (step S4). The calibration input unit 6 receives from a user calibration information on the crack candidate displayed on the object display unit 5 (step S5). When the calibration information from the user indicates that there is an error in the crack candidate (step S6: Yes), for example, when there is "x" as discussed above, the calibration input unit 6 corrects the crack candidate stored in the object storage unit 4, on the basis of the calibration information (step S7). Then, on the basis of the calibration information input at the calibration input unit 6, the object characteristic calibration unit 7 calibrates the parameter stored in the object characteristic storage device 2 (step S8).

In the detection apparatus 20, the process returns to step S1, and the same abnormality detection processing is performed repeatedly. The object detection unit 3 detects a crack candidate by using the calibrated parameter stored in the object characteristic storage device 2 (step S2). When there is no error in the crack candidate (step S6: No), for example, when "OK" is input as discussed, processing in step S7 of the calibration input unit 6 and processing in step S8 of the object characteristic calibration unit 7 are omitted, and the process returns to step S1.

In the detection apparatus 20, thus, when there is the error in the crack candidate detected by the object detection unit 3, the object characteristic calibration unit 7 calibrates the parameter stored in the object characteristic storage device 2, on the basis of the calibration information on the detected crack candidate. Since the detection apparatus 20 repeatedly performs the process illustrated in the flowchart in FIG. 2, the parameter stored in the object characteristic storage device 2 converges to a certain value. As a result, errors in the detection of crack candidate at the object detection unit 3 can be reduced. When there is no error in detection of the crack candidate, the detection apparatus 20 continues the inspection of crack detection by using a parameter obtained when there is no error in crack candidate detection.

As described above, according to the present embodiment, the detection apparatus 20 detects the crack candidate from the image information by using the parameter indicating the crack characteristic, and, when there is an error in the crack candidate, calibrates the parameter on the basis of the calibration information from the user. Thus, the detection apparatus 20 can improve crack detection accuracy by calibrating the parameter on the basis of the calibration information without requiring a large amount of work in the stage prior to starting the inspection operation and even during the inspection operation. The more the detection apparatus 20 is used, the more the crack detection accuracy can be improved. Further, the detection apparatus 20, which calibrates the parameter stored in the object characteristic storage device 2 on the basis of the calibration information received from the user, can a setting that facilitates the detection of the crack candidate which the user desires to detect. That is, the detection apparatus 20 is customized according to user's preference.

Second Embodiment

A description of the present embodiment is directed to a case where a detection apparatus stores a calibration history.

Figure 3:
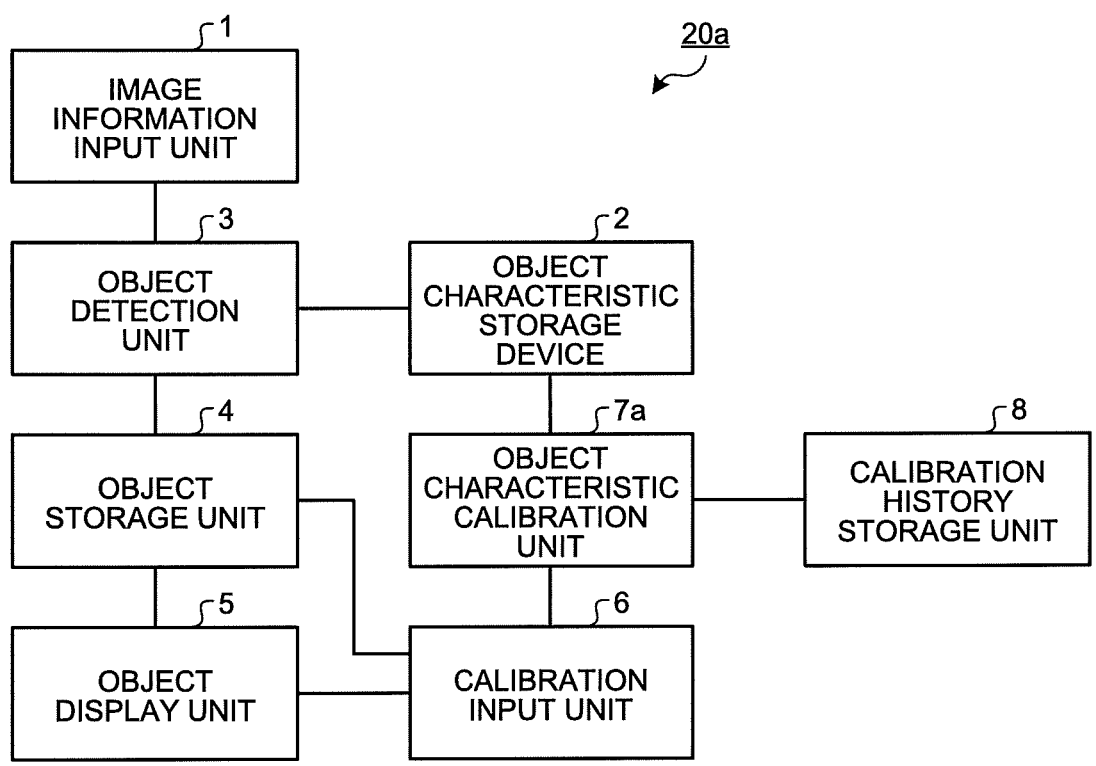
FIG. 3 is a block diagram illustrating a configuration example of a detection apparatus according to a second embodiment.

FIG. 3 is a block diagram illustrating a configuration example of a detection apparatus 20a according to the second embodiment. The detection apparatus 20a is the detection apparatus 20 having the object characteristic calibration unit 7 replaced with an object characteristic calibration unit 7a, and a calibration history storage unit 8 added.

The calibration history storage unit 8 stores a calibration history that is a history in which the parameter in the object characteristic storage device 2 is calibrated on the basis of the calibration information input from the calibration input unit 6 in the past.

The object characteristic calibration unit 7a calibrates the parameter stored in the object characteristic storage device 2, by using the calibration information received at the calibration input unit 6 and the calibration history stored in the calibration history storage unit 8. For example, when the object detection unit 3 has failed to detect a crack as a crack candidate even through this crack exists, the object characteristic calibration unit 7a calibrates the parameter stored in the object characteristic storage device 2 to facilitate the detection of the crack on the basis of the calibration information input from the calibration input unit 6. On the other hand, when the object characteristic calibration unit 7a changes the parameter too large, a crack can be erroneously detected as a crack candidate even through the crack does not exist. Therefore, when a new calibration occurs, the object characteristic calibration unit 7a refers to the calibration history stored in the calibration history storage unit 8, and calibrates the parameter stored in the object characteristic storage device 2 so as to reflect the content of the calibration information input from the calibration input unit 6.

As described above, according to the present embodiment, the detection apparatus 20a calibrates the parameter by using the calibration history in which the parameter was calibrated in the past. This can shorten a period of time taken for the parameter to converge to a certain value, compared to a case where the calibration history is not used. Although, in the first embodiment, the calibration input unit 6 has the storage unit that temporarily stores the calibration information received from the user, the calibration history storage unit 8 may be used in place of the storage unit of the calibration input unit 6 for temporarily storing calibration information.

Third Embodiment

A description of the present embodiment is directed to a case where a crack candidate is displayed in superposition on original image information. The description uses the first embodiment as an example, but the present embodiment is also applicable to the second embodiment.

Figure 4:
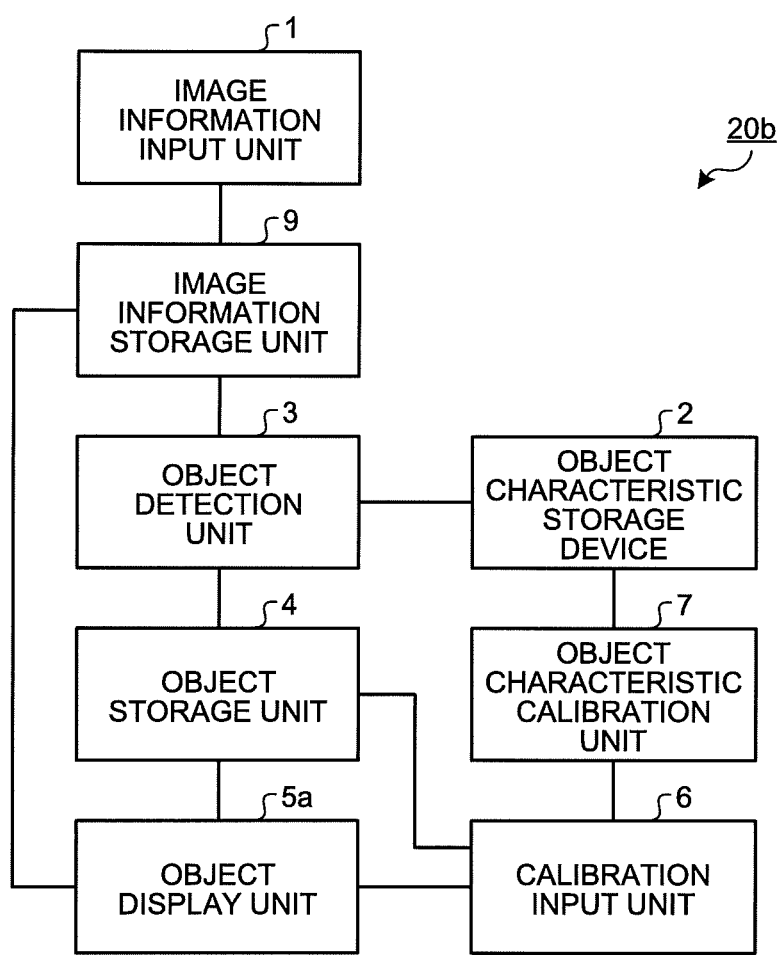
FIG. 4 is a block diagram illustrating a configuration example of a detection apparatus according to a third embodiment.

FIG. 4 is a block diagram illustrating a configuration example of a detection apparatus 20b according to the third embodiment. The detection apparatus 20b is the detection apparatus 20 having the object display unit 5 replaced with an object display unit 5a, and an image information storage unit 9 added.

The image information storage unit 9 stores image information input at an image information input unit 1. Using a parameter stored in the object characteristic storage device 2, the object detection unit 3 detects a crack candidate for the image information stored in the image information storage unit 9. A process of detecting a crack candidate in the object detection unit 3 is similar to that in the first embodiment.

The object display unit 5a displays the crack candidate stored in an object storage unit 4 and the image information stored in the image information storage unit 9, with the crack candidate and the image information being superposed on each other. When the object storage unit 4 stores the crack candidate in the form of information on a Bezier curve or a spline curve, or the like as described above, the object display unit 5 in the first embodiment can display the crack candidate but, in some cases, may fail to allow a user to imagine a site in a tunnel. In the present embodiment, the object display unit 5a displays the crack candidate in the object storage unit 4 and image information on the site in the tunnel, with the crack candidate and the image information being superposed on each other, such that the user who does not know the site is provided with the image that helps the user image the site.

As described above, according to the present embodiment, in the detection apparatus 20b, the crack candidate and the image information from which the object detection unit 3 detects the crack candidate are displayed with the crack candidate and the image information being superposed on each other. This can provide the user with the image that helps the user image the site and, as compared to a case where the superposition display is not done, can improve accuracy of calibration information from the user.

Fourth Embodiment

A description of the present embodiment is directed to a method of superimposing and displaying information on another inspection result and a crack candidate, with the information on the inspection result and the crack candidate being superposed on each other, and a method of detecting a crack candidate by using information on another inspection result. The description uses the first embodiment as an example, but the present embodiment is also applicable to the second and third embodiments.

Figure 5:
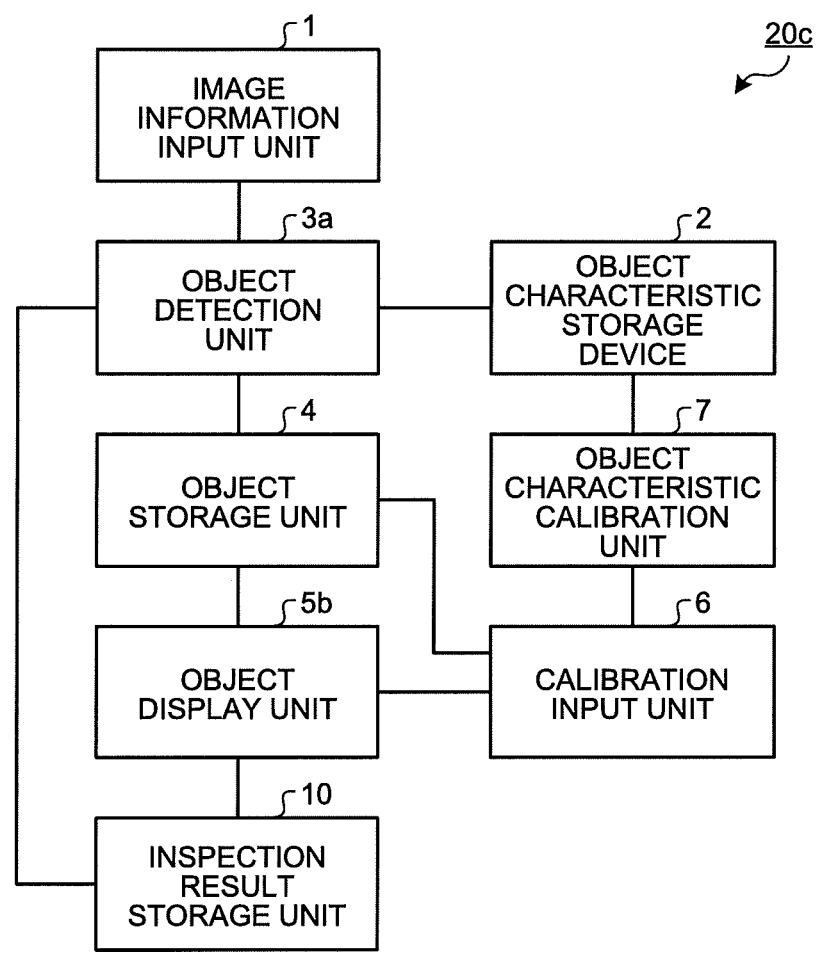
FIG. 5 is a block diagram illustrating a configuration example of a detection apparatus according to a fourth embodiment.

FIG. 5 is a block diagram illustrating a configuration example of a detection apparatus 20c according to the fourth embodiment. The detection apparatus 20c is the detection apparatus 20 having the object detection unit 3 replaced with an object detection unit 3a, the object display unit 5 replaced with an object display unit 5b, and an inspection result storage unit 10 added.

The inspection result storage unit 10 stores an inspection result of an inspection for cracks other than image information in the area of image information input at the image information input unit 1.

The object detection unit 3a acquires information on the inspection result stored in the inspection result storage unit 10. The object detection unit 3a detects a crack candidate outside an area indicated by the inspection result stored in the inspection result storage unit 10. Alternatively, the object detection unit 3a changes the value of the parameter stored in the object characteristic storage device 2, and detects a crack candidate within the area indicated by the inspection result stored in the inspection result storage unit 10.

The object display unit 5b displays the crack candidate stored in the object storage unit 4 and the inspection result stored in the inspection result storage unit 10, with the crack candidate and the inspection result being superposed on each other. The object display unit 5b in the present embodiment can provide a user with a lot of visualized information by using the crack candidate in the object storage unit 4 and the inspection result of the inspection other than image information. The description below is made on the assumption that the inspection other than image information is a hammering test.

First, a description is made as to a case where information on another inspection result and a crack candidate are displayed as being superimposed on each other. FIG. 6 is a diagram illustrating an example of a method for calibrating crack candidates by the detection apparatus 20c according to the fourth embodiment. FIG. 6(*a*) is a diagram illustrating crack candidates stored in the object storage unit 4. FIG. 6(*b*) illustrates an abnormal location provided by a hammering test, the abnormal location being stored in the inspection result storage unit 10. FIG. 6(*c*) illustrates a state in which the crack candidates and the abnormal portion detected by the hammering test are displayed as being superimposed on each other. FIG. 6(*d*) illustrates the content of calibration determined.

As illustrated in FIG. 6(*c*), the crack candidates stored in the object storage unit 4 illustrated in FIG. 6(*a*) and the inspection result stored in the inspection result storage unit 10 illustrated in FIG. 6(*b*) are displayed as being superposed on each other by the object display unit 5b. A user can make a judgment on the crack candidates on the basis of the superposition image of FIG. 6(*c*) displayed on the object display unit 5b. With regard to a crack candidate (X) illustrated in FIG. 6(*a*), for example, the user can judge that calibration should be performed to delete from FIG. 6(*a*) the crack candidate (X) because the abnormal location of FIG. 6(*b*) provided by the hammering test shows no detected abnormalities at a location of the crack (X). The operations of the calibration input unit 6 that has received from the user the calibration information on the deletion of the crack candidate (X), and the object characteristic calibration unit 7 are similar to those in the above-described first embodiment, for example.

Next, a method of detecting a crack candidate by using information on another inspection result will be described. The object detection unit 3a acquires information on the inspection result stored in the inspection result storage unit 10 to obtain the information on the abnormal location detected by the hammering test illustrated in FIG. 6(b). The object detection unit 3a performs detection of a crack candidate from the image information outside the area of the abnormal location provided by the hammering test, without performing crack candidate detection processing on the area of the abnormal location provided by the hammering test illustrated in FIG. 6(b). In this case, the object detection unit 3a detects the crack candidate (X) illustrated in, for example, FIG. 6(c). The object detection unit 3a, which limits the area that is to be subjected to the crack candidate detection processing, can lighten a load on the detection processing and shorten the detection time. Alternatively, the object detection unit 3a changes the value of the parameter stored in the object characteristic storage device 2 and detects the crack candidate from the image information within the area of the abnormal location provided by the hammering test illustrated in FIG. 6(b). It is imaginable that a crack candidate is more likely to be detected within the area of the abnormal location provided by the hammering test illustrated in FIG. 6(b) than outside the area of the abnormal location provided by the hammering test illustrated in FIG. 6(b). The object detection unit 3a can improve the crack candidate detection accuracy by changing the value of the parameter, namely, changing the crack candidate detection sensitivity, to perform detection processing. Alternatively, the object detection unit 3a changes the value of the parameter stored in the object characteristic storage device 2, and detects the crack candidate from the image information within the area of the abnormal location provided by the hammering test illustrated in FIG. 6(b). Outside the area of the abnormal location provided by the hammering test illustrated in FIG. 6(b), the object detection unit 3a may perform the normal crack candidate detection processing.

Although the description has been made as to the method in which the crack candidate and the abnormal location provided by the hammering test are displayed as being superposed on each other, and the method for detecting the crack candidate by using the information on the abnormal location provided by the hammering test, the configuration of the detection apparatus 20c illustrated in FIG. 5 is not limited to this. For example, when only the method in which a crack candidate and an abnormal location provided by the hammering test are displayed as being superposed on each other is performed, the connection between the inspection result storage unit 10 and the object detection unit 3a can be eliminated. In this case, the object detection unit 3a may have the configuration of the object detection unit 3 as in the first embodiment. When only the method for detecting the crack candidate by using the information on the abnormal location provided by the hammering test is performed, the connection between the inspection result storage unit 10 and the object display unit 5b can be eliminated. In this case, the object display unit 5b may have the configuration of the object display unit 5 as in the first embodiment.

As described above, according to the present embodiment, the crack candidate and the inspection result other than image information are displayed as being superposed on each other by the detection apparatus 20c. This can provide a user with an image of inspection results of a plurality of different inspections, and, as compared to a case where the superimposition display is not performed, can improve accuracy of calibration information from the user.

The detection apparatus 20c detects the crack candidate by using the inspection result other than the image information. Thus, the detection apparatus 20c can lighten the load on the detection processing and shorten the detection time, by performing the crack candidate detection processing outside the area indicated by the inspection result other than the image information. Further, the detection apparatus 20c can improve the crack candidate detection accuracy by changing the value of the parameter and performing the crack candidate detection processing within the area indicated by the inspection result other than the image information.

Fifth Embodiment

A description of the present embodiment is directed to a method of projecting, by an object display unit 5, a crack candidate onto a place where image information is taken. The description uses the first embodiment as an example, but the present embodiment is also applicable to the second to fourth embodiments.

Figure 7:
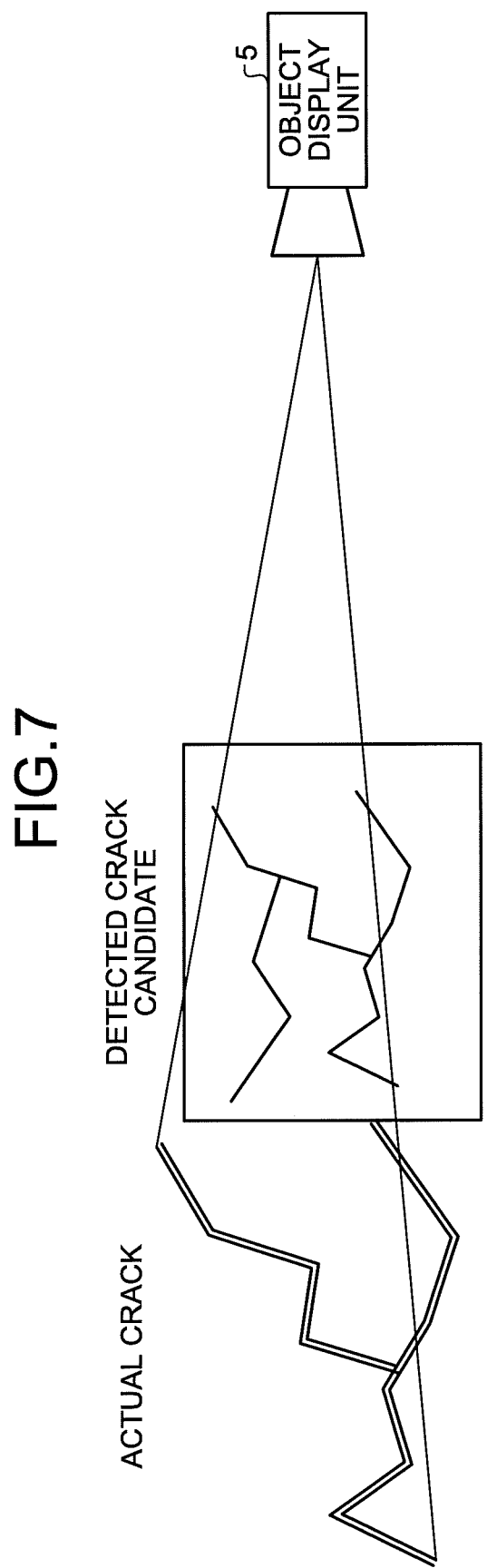
FIG. 7 is a diagram illustrating an example of projecting a crack candidate for display at a detection apparatus according to a fifth embodiment.

FIG. 7 is a diagram illustrating an example of projecting a crack candidate for display at the detection apparatus 20 according to the fifth embodiment. The configuration of the detection apparatus 20 in the present embodiment is similar to that in the first embodiment. In the first embodiment, the crack candidate is displayed on the display of the personal computer or the like of the detection apparatus 20. If the detection apparatus 20 is sized to be brought to a site where the inspection is conducted, such a size of the detection apparatus 20 is brought to this inspection site, and the object display unit 5 projects a detected crack candidate onto the site at which the image information has actually been taken. Projection methods include a method using a projector. Alternatively, a crack candidate may be displayed on a head-mounted display worn by a user so that the user sees an actual crack over the head-mounted display.

At the side where the inspection is conducted, a user can compare an actual situation in a tunnel, that is, an actual crack with a projected crack candidate, and can accurately make a judgment on the crack candidate, as compared to a case where a crack candidate is checked in a place different from the inspection site. Alternatively, the object display unit 5 can project a crack candidate onto a place other than a side where image information has actually been taken. Although, in the fourth embodiment, the crack candidate and the abnormal location provided by the hammering test are displayed as being superposed on each other by the object display unit 5b, the object display unit 5b can project and display such an image in which the crack candidate is superimposed.

As described above, according to the present embodiment, the object display unit 5 of the detection apparatus 20 projects and displays the crack candidate onto the site where the image information has been taken. This can improve accuracy of calibration information from a user, as compared with a case where the crack candidate is displayed on a display of a personal computer or the like.

Sixth Embodiment

A description of the present embodiment is directed to a specific example of a calibration method by a detection apparatus. The description uses the first embodiment as an example, but the present embodiment is also applicable to the second to fifth embodiments.

Figure 8:
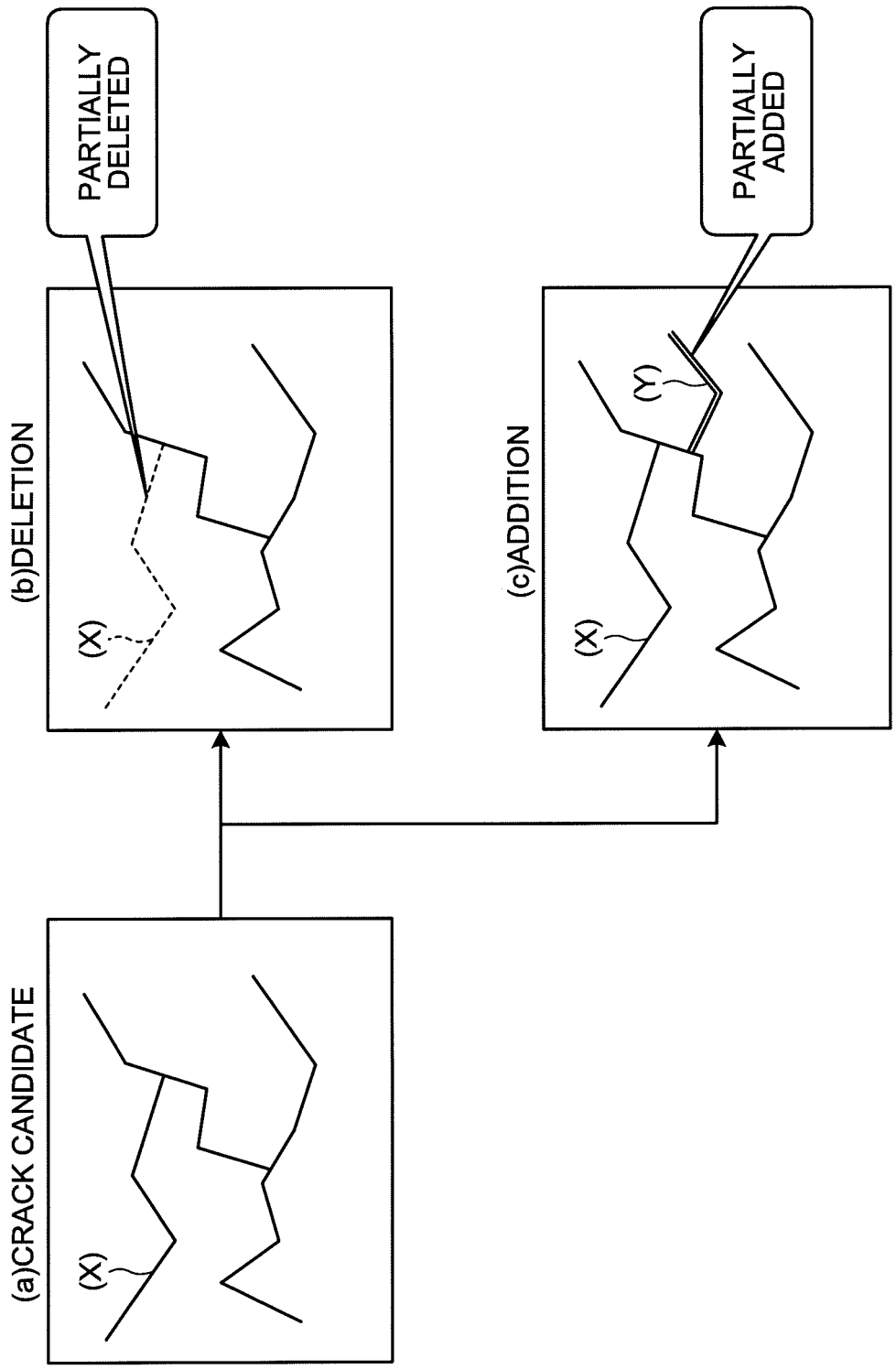
FIG. 8 is a diagram illustrating an example of a method for calibrating a crack candidate by a detection apparatus according to a sixth embodiment.

FIG. 8 is a diagram illustrating an example of a method for calibrating a crack candidate by the detection apparatus 20 according to the sixth embodiment. FIG. 8(a) is a crack candidate displayed on the object display unit 5. FIG. 8(b) illustrates a calibration method in which a crack at a portion of the crack candidate is deleted. FIG. 8(c) illustrates a calibration method in which a crack is added to a portion of the crack candidate.

In the detection apparatus 20, the calibration input unit 6 receives as calibration information the input of "x" from the user about a crack candidate among crack candidates displayed on the object display unit 5, which crack candidate is judged by a user to be not a crack. On the basis of the calibration information, the calibration input unit 6 make correction to delete the location judged to be not a crack, among the crack candidates stored in the object storage unit 4. Then, the calibration input unit 6 outputs to the object characteristic calibration unit 7 the calibration information on the crack candidate judged to be not a crack. The object characteristic calibration unit 7 calibrates the parameter stored in the object characteristic storage device 2 so that the location taken as the crack candidate will not be detected as a crack candidate in the next crack detection processing. In an example of the first embodiment, the calibration to increase the intensity gradient threshold stored in the object characteristic storage device 2 is performed.

In the detection apparatus 20, the calibration input unit 6 receives as calibration information the input of "x" from the user about a location not indicated as a crack candidate like the crack candidates displayed on the object display unit 5, which location is judged by the user to have a crack. On the basis of the calibration information, the calibration input unit 6 makes correction to add a crack at the location to the crack candidates stored in the object storage unit 4, which location is judged by the user to have a crack. Then, the calibration input unit 6 outputs to the object characteristic calibration unit 7 the calibration information on the crack that has not been detected as a crack candidate. The object characteristic calibration unit 7 calibrates the parameter stored in the object characteristic storage device 2 so that the crack that has not been detected as the crack candidate will be detected as a crack candidate in the next crack detection processing. In an example of the first embodiment, the calibration to decrease the intensity gradient threshold stored in the object characteristic storage device 2 is performed.

As described above, according to the present embodiment, when there is an error in detecting a crack candidate, the calibration input unit 6 of the detection apparatus 20 makes correction to add a crack to or delete a crack from the crack candidates stored in the object storage unit 4, and outputs the calibration information to the object characteristic calibration unit 7, and the object characteristic calibration unit 7 calibrates the parameter stored in the object characteristic storage device 2. Thus, even during an inspection operation, the detection apparatus 20 can improve crack detection accuracy by correcting the crack candidate and calibrating the parameter, on the basis of the calibration information.

Seventh Embodiment

A description of the present embodiment is directed to an application example of the sixth embodiment, and in particular, to a specific example of a calibration method by the detection apparatus 20. The description uses the first embodiment as an example, but the present embodiment is also applicable to the second to fifth embodiments.

Figure 9:
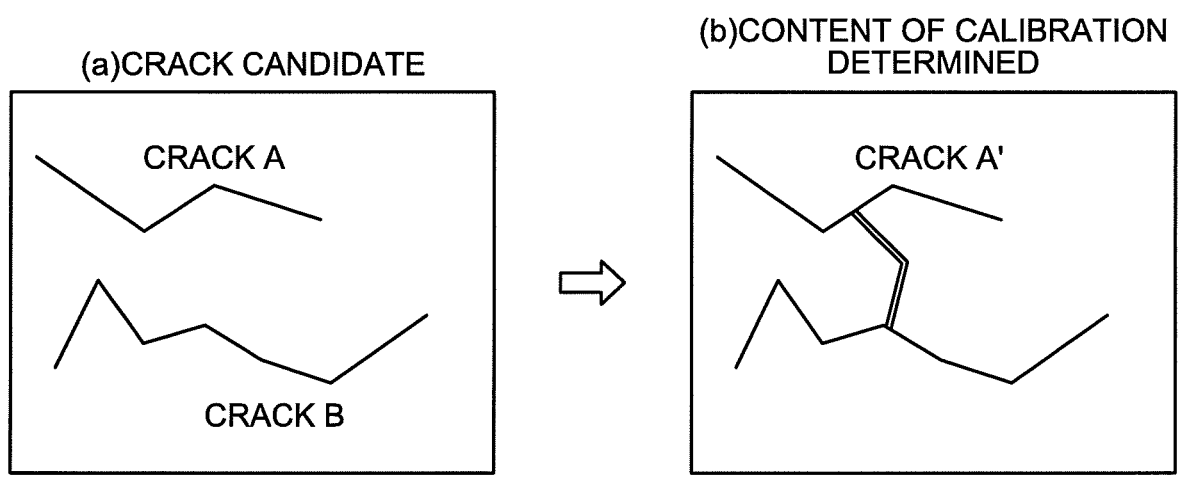
FIG. 9 is a diagram illustrating an example of a method for calibrating a crack candidate by a detection apparatus according to a seventh embodiment.

FIG. 9 is a diagram illustrating an example of a method for calibrating a crack candidate by the detection apparatus 20 according to the seventh embodiment. FIG. 9(a) illustrates crack candidates displayed on the object display unit 5, and FIG. 9(b) illustrates the content of calibration determined. In the seventh embodiment, in the detection apparatus 20, the calibration input unit 6 receives as calibration information the input of "x" from the user about a location not indicated as a crack candidate like the crack candidates displayed on the object display unit 5, which location is judged by a user to have a crack. On the basis of the calibration information, the calibration input unit 6 makes correction to add a crack at the location to the crack candidates stored in the object storage unit 4. Then, the calibration input unit 6 outputs to the object characteristic calibration unit 7 the calibration information on the crack that has not been detected as a crack candidate.

At this time, when the addition of the crack to the crack candidates reveals that cracks having been so far considered to be separate provide, actually, a single crack, the calibration input unit 6 thereafter treats these cracks as the single crack. Treating the cracks as the single crack means that, for example, when a plurality of crack candidates is stored in the object storage unit 4 and the object detection unit 3 assigns an identification number such as a serial number to each of the crack candidates, the calibration input unit 6 assigns a new identification number to each of the crack candidates. In the example of FIG. 9, the calibration input unit 6 corrects the crack candidates stored in the object storage unit 4 so that two cracks taken as a crack A and a crack B are treated as a crack A'.

The object characteristic calibration unit 7 calibrates the parameter stored in the object characteristic storage device 2, in the manner as discussed above, so that a crack that has not been detected as a crack candidate will be judged to be a crack in the next crack detection processing, specifically, so that a crack is detected at a location interconnecting the crack A and the crack B in FIG. 9(a). In an example of the first embodiment, the object characteristic calibration unit 7 performs the calibration to decrease the intensity gradient threshold stored in the object characteristic storage device 2.

Unlike the example in FIG. 9, in some case, a crack having been considered to be a single crack as illustrated in FIG. 9(b), but turns out to be actually two separate cracks as illustrated in FIG. 9(a). In this case, the calibration input unit 6 of the detection apparatus 20 makes correction to delete, from the crack candidate stored in the object storage unit 4, a crack at a location judged to be a crack. The calibration input unit 6 outputs to the object characteristic calibration unit 7 the calibration information on the location having been erroneously detected as a crack candidate. At this time, when the deletion of the crack from the crack candidate reveals that a crack having been so far considered to be a single crack provides, actually, two cracks, the calibration input unit 6 thereafter treats the crack as two cracks. Specifically, the calibration input unit 6 makes correction to divide one crack candidate stored in the object storage unit 4 into a plurality of crack candidates, and assigns a new identification number to each of the crack candidates.

As described above, according to the present embodiment, when there in an error in detecting a crack candidate, the calibration input unit 6 of the detection apparatus 20 makes correction to combine a plurality of crack candidates stored in the object storage unit 4 into one crack candidate or divide one crack candidate stored in the object storage unit 4 into a plurality of crack candidates. Thus, even during an inspection operation, the detection apparatus 20 can correct the crack candidate to conform to an actual crack form on the basis of the calibration information.

Eighth Embodiment

A description of the present embodiment is directed to a case where a plurality of users performs calibration by the detection apparatus 20. The description uses the first embodiment as an example, but the present embodiment is also applicable to the second to seventh embodiments.

Figure 10:
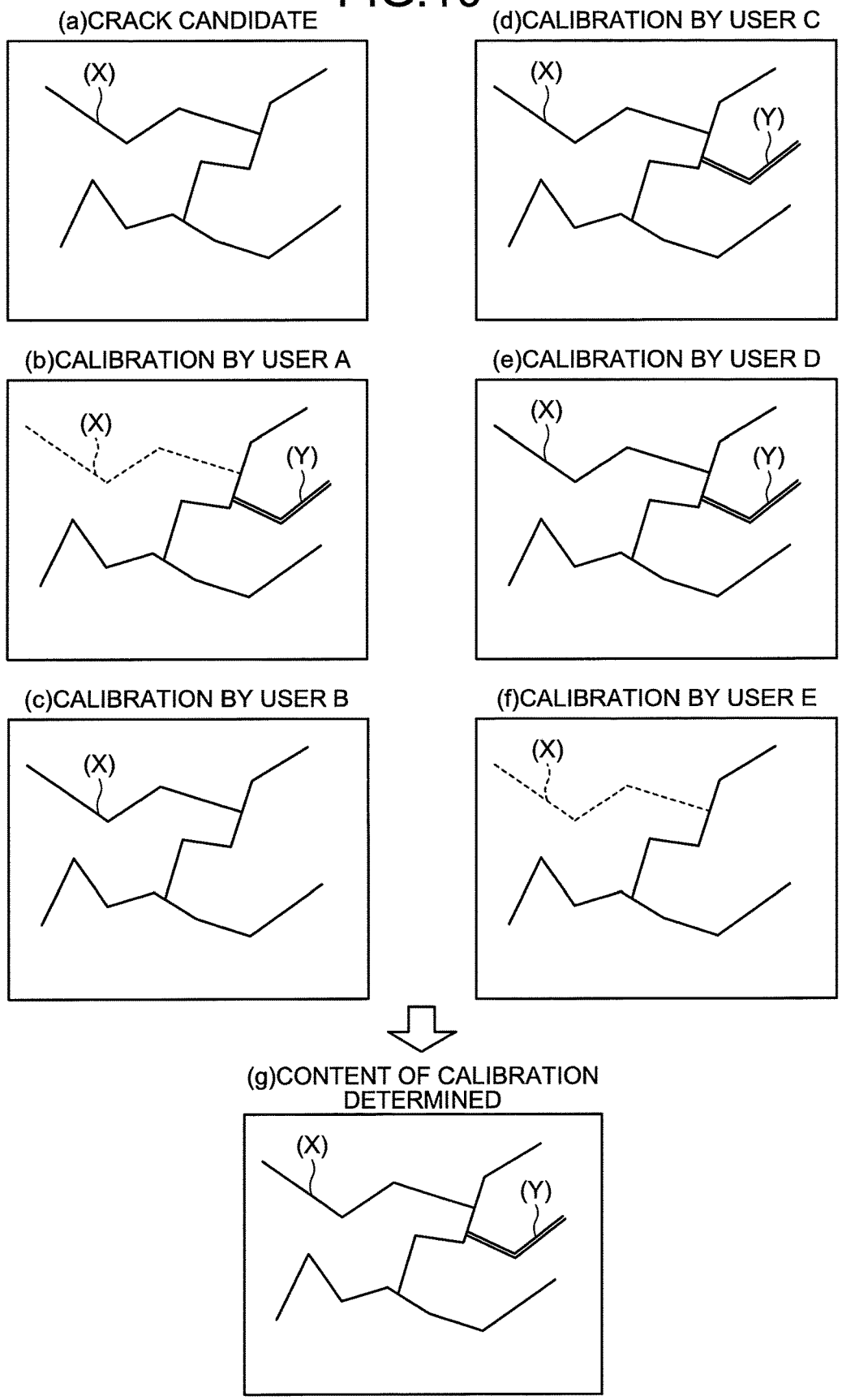
FIG. 10 is a diagram illustrating an example of a method for calibrating a crack candidate by a detection apparatus according to an eighth embodiment.

FIG. 10 is a diagram illustrating an example of a method for calibrating a crack candidate by the detection apparatus 20 according to the eighth embodiment. FIG. 10(*a*) is a diagram illustrating crack candidates displayed on the object display unit 5. FIGS. 10(*b*) to 10(*f*) illustrate the contents of calibration on the crack candidates by the users. FIG. 10(*g*) illustrates the content of calibration determined.

In the detection apparatus 20, the calibration input unit 6 receives, as calibration information, the input of "x" from the users about a crack candidate among crack candidates displayed on the object display unit 5, which crack candidate is judged by each user to be not a crack. Also, the calibration input unit 6 receives, as calibration information, the input of "x" from the users about a location not indicated as a crack candidate like the crack candidates displayed on the object display unit 5, which location is judged by each user to have a crack. Two users A and E have judged that a crack (X) of the crack candidates is not a crack, but three users B, C, and D have judged the crack (X) to be a crack. Three users A, C, and D have judged that a location (Y), which has not been displayed as a crack candidate on the object display unit 5, has a crack, and two users B and E have judged that the location (Y) has no crack.

In the present embodiment, the calibration input unit 6 determines the content of calibration, that is, calibration information by majority decision made on information received from the users with respect to a crack candidate on which a plurality of users have different judges. The calibration input unit 6 temporarily stores information received from the users in a storage unit that the calibration input unit 6 has. In the example of FIG. 10, the above three-to-two user's judgement causes the calibration input unit 6 to determine that the crack candidate (X) is a crack, and determine that the location (Y) has a crack. The calibration input unit 6 eventually decides to perform calibration with the content illustrated in FIG. 10(*g*). The calibration input unit 6 makes correction to add the crack at the portion (Y) to the crack candidates stored in the object storage unit 4, which portion (Y) has been judged to have a crack. Then, the calibration input unit 6 outputs to the object characteristic calibration unit 7 calibration information on the crack at the portion (Y) that has not been detected as a crack candidate. The object characteristic calibration unit 7 calibrates the parameter stored in the object characteristic storage device 2 so that the crack at the portion (Y) that has not been detected as a crack candidate will detected as a crack candidate in the next crack detection processing. In an example of the first embodiment, calibration to decrease the intensity gradient threshold stored in the object characteristic storage device 2 is performed.

As described above, according to the present embodiment, in the detection apparatus 20, when the calibration input unit 6 receives the calibration information from a plurality of users, the calibration input unit 6 determines the content of calibration by majority decision made on judgments of the users with respect to the location on which the users have made different judgements. Thus, the detection apparatus 20 can determine the content of final calibration by simple computation, employing judgments of a plurality of users.

Ninth Embodiment

A description of the present embodiment is directed to an example different from that in the eighth embodiment in a case where a plurality of users performs calibration on the detection apparatus 20. The description uses the first embodiment as an example, but the present embodiment is also applicable to the second to seventh embodiments.

Figure 11:
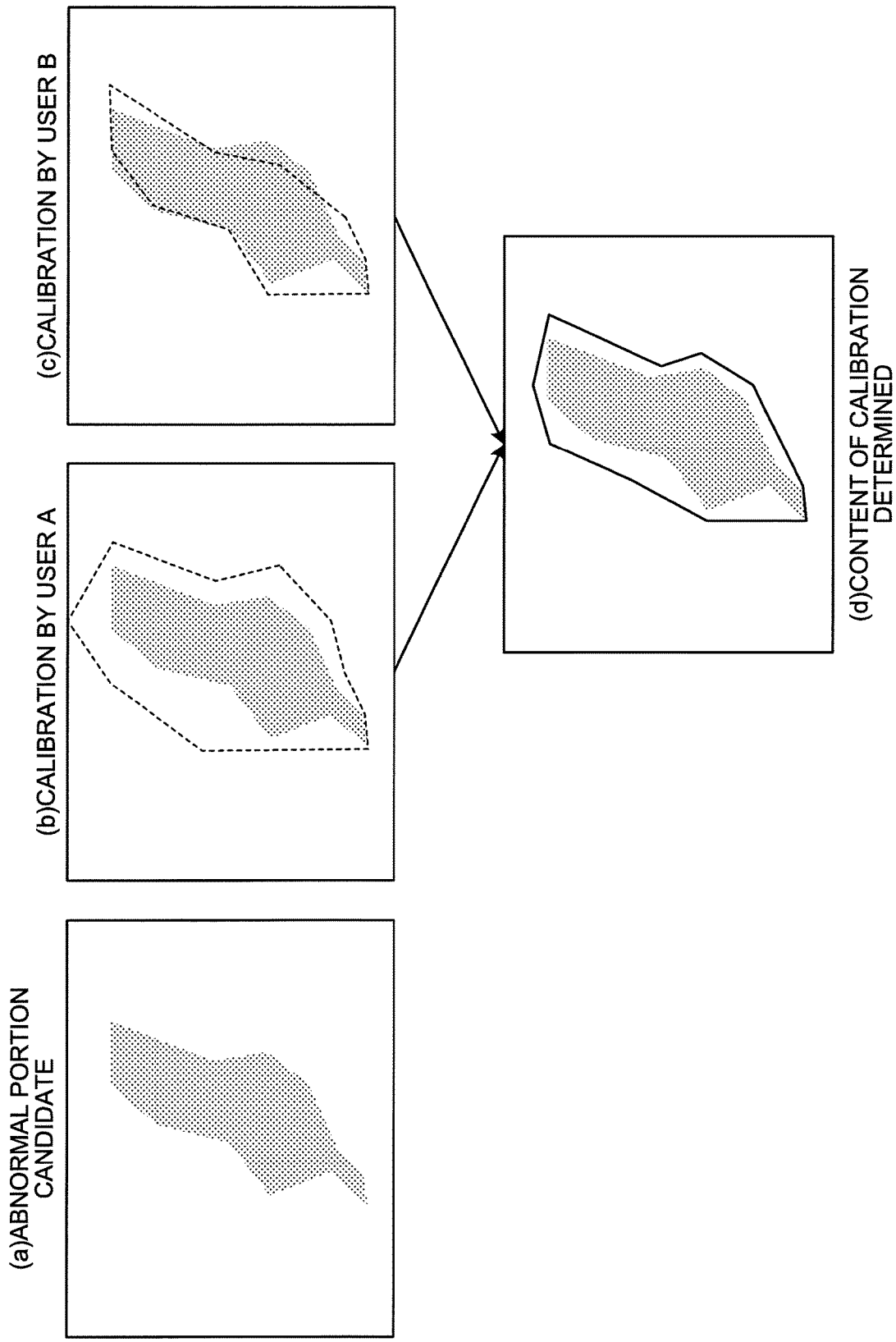
FIG. 11 is a diagram illustrating an example of a method for calibrating an abnormal portion candidate by a detection apparatus according to a ninth embodiment.

FIG. 11 is a diagram illustrating an example of a method for calibrating an abnormal location candidate by the detection apparatus 20 according to the ninth embodiment. For example, when a plurality of cracks has centrally occurred in a wide area, the area of the occurrence of the cracks is shown as an abnormal location candidate. Alternatively, the abnormal location candidate can be used as the length of an individual crack candidate. FIG. 11(*a*) is a diagram illustrating an abnormal location candidate displayed on the object display unit 5. FIGS. 11(*b*) and 11(*c*) illustrate the content of calibration on the abnormal location candidates by users. FIG. 11(*d*) illustrates the content of calibration determined.

In the eighth embodiment, when a plurality of users performs calibration, the calibration input unit 6 determines the content of calibration by majority decision made on calibration information input by the plurality of users. In the present embodiment, the calibration input unit 6 determines the content of calibration, that is, calibration information used for crack candidate correction and parameter calibration, on the basis of the ratios of pieces of calibration information input by a plurality of users. In the example in FIG. 11, for the abnormal location candidate displayed on the object display unit 5 illustrated in FIG. 11(*a*), a user A judges that an abnormal location candidate exists within an area of a dotted line illustrated in FIG. 11(*b*). For the abnormal location candidate displayed on the object display unit 5 illustrated in FIG. 11(*a*), a user B has judged that an abnormal location candidate exists in an area of a dotted line illustrated in FIG. 11(*c*). In this case, for example, the calibration input unit 6 determines an abnormal location on the basis of the ratio between the area of the dotted line illustrated in FIG. 11(*b*) and the area of the dotted line illustrated in FIG. 11(*c*). Specifically, the calibration input unit 6 determines that the area indicated by a solid line of FIG. 11(*d*) extending along midpoints between the dotted-line area of FIG. 11(*b*) and the dotted-line area of FIG. 11(*c*) is defined as the abnormal location.

Alternatively, the calibration input unit 6 may weight the result of each user's judgment. For example, when the user A is an expert with longer years of experience in inspection than the user B, the calibration input unit 6 increases the weight of a judgment result of the user A, that is, changes the ratio between the dotted line areas indicated by the judgment results of the users, thereby making it possible to enlarge the area of the abnormal location shown by the solid line in FIG. 11(*d*). Alternatively, each user may report weights on his own, depending on whether the users have confidence in the results of his own judgment or not. In the example in FIG. 11, the weight of the judgment result of the user A is equal to the weight of the judgment result of the user B.

As described above, according to the present embodiment, in the detection apparatus 20, when the calibration input unit 6 receives the calibration information from the plurality of users, the calibration input unit 6 determines the content of calibration on the basis of the ratios of the respective users' judgment results. Thus, the detection apparatus 20 can determine the final content of calibration by employing judgments of the plurality of users while increasing the specific weight of the judgment content of a user whose judgment accuracy is estimated to be high.

Tenth Embodiment

A description of the present embodiment is directed to a case where a detection apparatus stores different parameters used in the detection of crack candidates for different objects to be inspected, and uses the parameters, depending on the objects. The description uses the first embodiment as an example, but the present embodiment is also applicable to the second to ninth embodiments.

Figure 12:
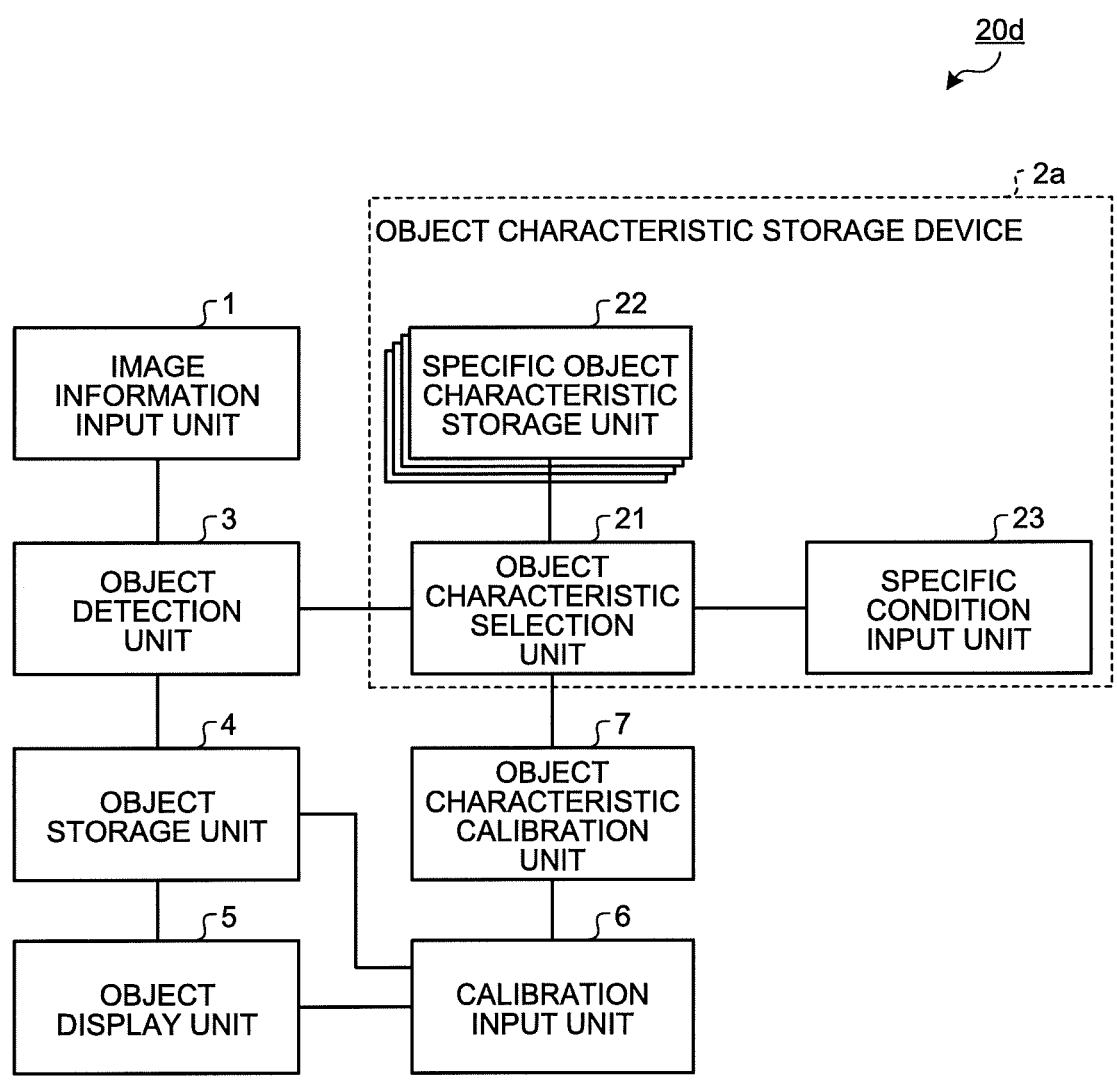
FIG. 12 is a block diagram illustrating a configuration example of a detection apparatus according to a tenth embodiment.

FIG. 12 is a block diagram illustrating a configuration example of a detection apparatus 20d according to the tenth embodiment. The detection apparatus 20d is the detection apparatus 20 having the object characteristic storage device 2 replaced with an object characteristic storage device 2a. The object characteristic storage device 2a has an object characteristic selection unit 21, a plurality of specific object characteristic storage units 22, and a specific condition input unit 23.

The object characteristic selection unit 21 selects one specific object characteristic storage unit 22 from the plurality of specific object characteristic storage units 22, and sets a parameter stored in the selected specific object characteristic storage unit 22 as a parameter to be used by the object detection unit 3.

The plurality of specific object characteristic storage units 22 each of which is an object characteristic storage unit stores various parameters indicating the characteristics of abnormal objects to be detected, the parameters being set for different objects to be inspected.

The specific condition input unit 23 receives input of, for example, conditions of objects to be inspected, for the plurality of specific object characteristic storage units 22.

The descriptions of the first to ninth embodiments are directed to, specifically, to a case where cracks occurring in a tunnel are detected. However, there are many tunnels to be inspected in different conditions including weather conditions at places where the tunnels are placed, concrete materials used, and construction methods. When only one type of parameter can be set, it is conceivable that even when the parameter is calibrated based on a plurality of times of crack detection, the object detection unit 3 tends to fail to detect a crack candidate in some tunnel although the tunnel has a crack, or the object detection unit 3 tends to erroneously detect a crack candidate in another tunnel although the other tunnel has no crack. For example, it is imaginable that when the same parameter is used to detect cracks of a tunnel under a foggy humid environment and a tunnel under a dry environment, the crack of the former tunnel is difficult to detect while the crack of the latter tunnel is easy to detect.

Thus, in the present embodiment, a parameter is set for each of tunnels under different environments, for example. In the detection apparatus 20d, different parameters for different tunnels are stored in the plurality of specific object characteristic storage units 22, and the object characteristic selection unit 21 selects the specific object characteristic storage unit 22 in which a parameter for a tunnel to be inspected is stored. The object detection unit 3 detects a crack candidate by using the parameter stored in the specific object characteristic storage unit 22 selected by the object characteristic selection unit 21. A method for detecting a crack candidate by the object detection unit 3 is similar to that in the first to ninth embodiments. Although a parameter calibration method is also similar to the method described in the embodiments so far, the object characteristic calibration unit 7 calibrates the parameter stored in the specific object characteristic storage unit 22 selected by the object characteristic selection unit 21, via the object characteristic selection unit 21.

Figure 13:
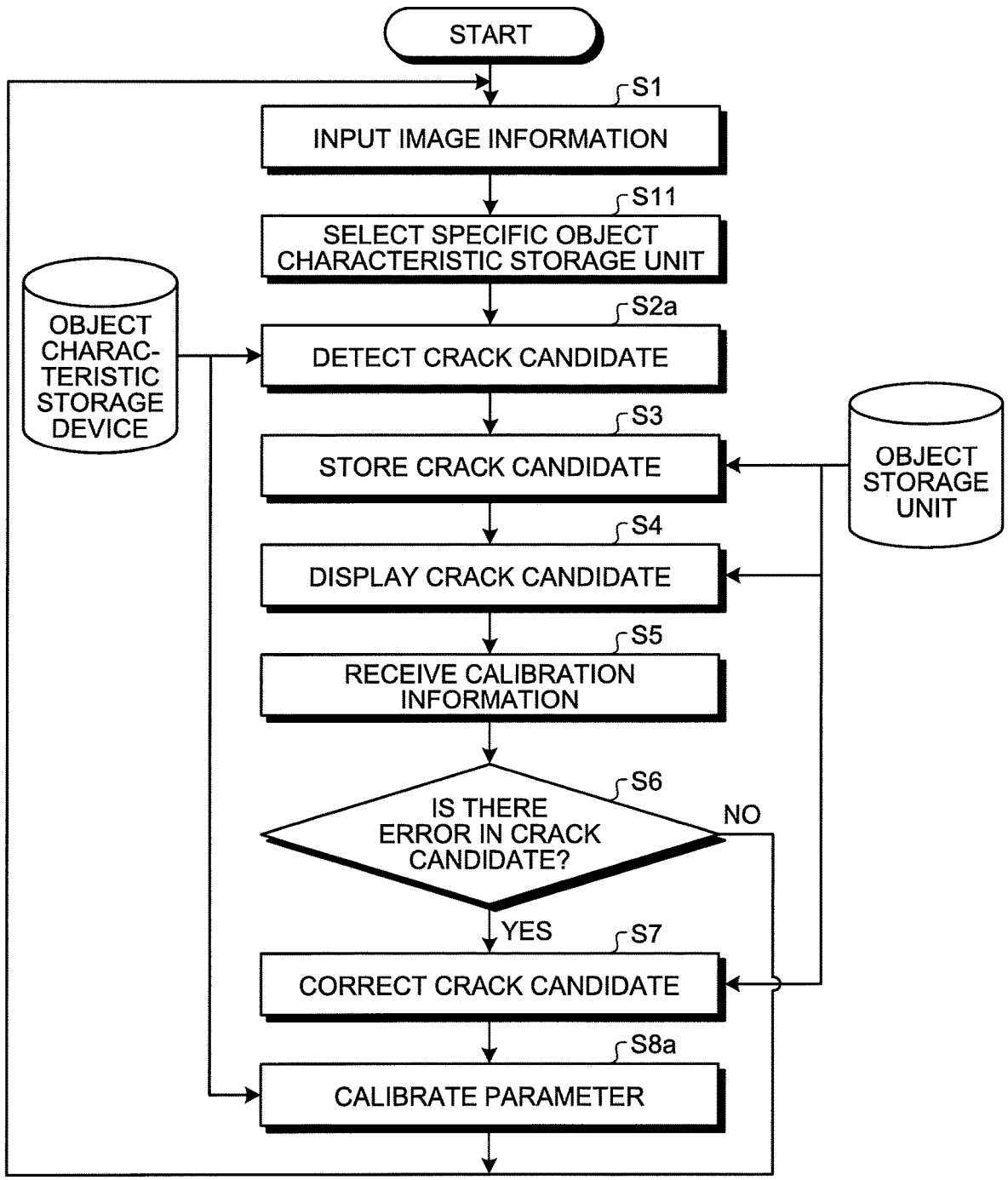
FIG. 13 is a flowchart illustrating crack candidate detection processing in the detection apparatus according to the tenth embodiment.

Next, a description is made as to a flowchart of abnormality detection processing in the detection apparatus 20d, specifically, as to a process of detecting cracks occurring in a surface in an inspection of a concrete tunnel. FIG. 13 is a flowchart illustrating crack candidate detection processing in the detection apparatus 20d according to the tenth embodiment. In the detection apparatus 20d, the parameter is set in each of the specific object characteristic storage units 22 so that the object detection unit 3 can use the parameter stored in each of the specific object characteristic storage units 22 of the object characteristic storage device 2a.

Processing in step S1 illustrated in FIG. 13 is similar to the processing in step S1 illustrated in the flowchart in FIG. 2. After the processing in step S1, the object characteristic selection unit 21 selects the specific object characteristic storage unit 22 from the plurality of specific object characteristic storage units 22, the selected specific object characteristic storage unit 22 storing a parameter for a tunnel to be inspected this time (step S11). Using the parameter stored in the specific object characteristic storage unit 22 selected by the object characteristic selection unit 21, the object detection unit 3 detects a crack candidate from the image information input from the image information input unit 1 (step S2a). After that, processing in steps S3 to S7 illustrated in FIG. 13 is similar to the processing in steps S3 to S7 illustrated in the flowchart in FIG. 2. After the processing in step S7, on the basis of the calibration information input at the calibration input unit 6, the object characteristic calibration unit 7 calibrates the parameter stored in the specific object characteristic storage unit 22 selected by the object characteristic selection unit 21, via the object characteristic selection unit 21 (step S8a). A method for calibrating the parameter in the specific object characteristic storage unit 22 by the object characteristic calibration unit 7 is similar to that when a parameter in the object characteristic storage device 2 is calibrated. Although the processing in step S11 is performed between step S1 and step S2a in FIG. 13, the processing in step S11 may be performed immediately before step S1.

The detection apparatus 20d, which has a plurality of specific object characteristic storage units 22 for different objects to be inspected, can detect not only tunnels but also other structures such as bridges. When different parameters are stored in the plurality of specific object characteristic storage units 22, a plurality of parameters for some structure under, for example, different indoor or outdoor environments may be stored.

As described above, according to the present embodiment, the detection apparatus 20d has the plurality of different parameters for different objects to be inspected and different inspection conditions. The detection apparatus 20d allows for a plurality of inspection conditions by storing parameters for various conditions for different tunnels, different structures other than tunnels, different installation condition of a structure such as an indoor installation and an outdoor installation, different temperatures and humidities of an installation environment, concrete materials, and different construction method such as a shield tunneling, a reinforced concrete (RC) structure, and a spray method.

Eleventh Embodiment

A description of the present embodiment is directed to a method different from that in the tenth embodiment in a case where a detection apparatus stores different parameters used for detection of crack candidates for different objects to be inspected, and uses the parameters, depending on the objects. The description uses the first embodiment as an example, but the present embodiment is also applicable to the second to ninth embodiments.

Figure 14:
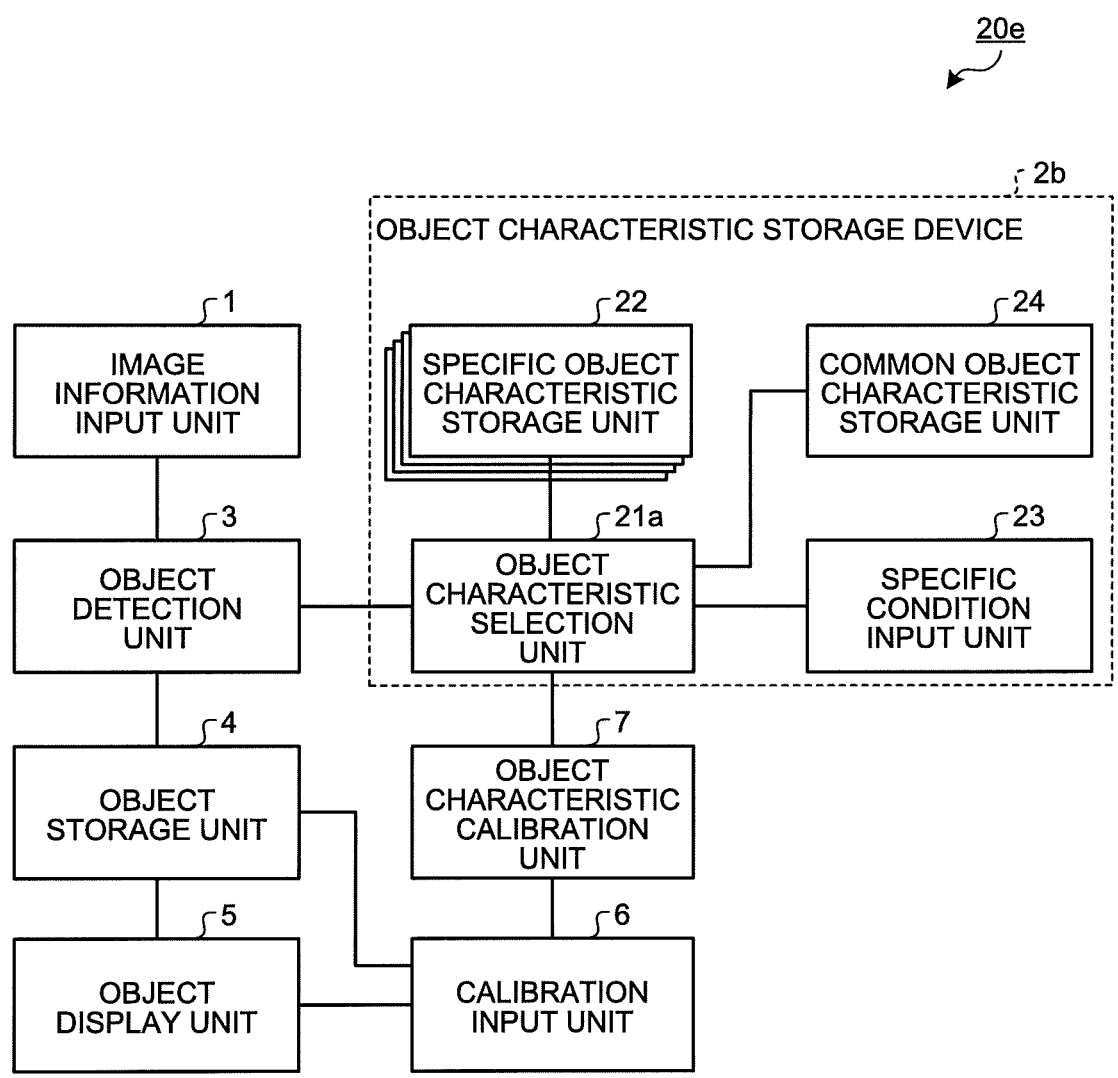
FIG. 14 is a block diagram illustrating a configuration example of a detection apparatus according to an eleventh embodiment.

FIG. 14 is a block diagram illustrating a configuration example of a detection apparatus 20e according to the eleventh embodiment. The detection apparatus 20e is the detection apparatus 20 having the object characteristic storage device 2 replaced with an object characteristic storage device 2b. The object characteristic storage device 2b has an object characteristic selection unit 21a, a plurality of specific object characteristic storage units 22, the specific condition input unit 23, and a common object characteristic storage unit 24.

The common object characteristic storage unit 24, which is an object characteristic storage unit, stores various parameters indicating the characteristics of abnormal objects for all objects to be inspected. The common object characteristic storage unit 24 has a configuration corresponding to that of the object characteristic storage device 2 in the first embodiment.

The object characteristic selection unit 21a selects one object characteristic storage unit from the plurality of specific object characteristic storage units 22 and the common object characteristic storage unit 24, and sets a parameter stored in the selected object characteristic storage unit as a parameter to be used by the object detection unit 3.

Crack candidate detection processing in the detection apparatus 20e is similar to that in the flowchart illustrated in FIG. 13 in the tenth embodiment. In the present embodiment, in processing in step S11, the object characteristic selection unit 21a selects from the plurality of specific object characteristic storage units 22 and the common object characteristic storage unit 24, one specific object characteristic storage unit 22 or the common object characteristic storage unit 24 in which a parameter for a tunnel to be inspected this time is stored. In processing in step S2a, the object detection unit 3 detects a crack candidate from the image information input from the image information input unit 1, by using the parameter stored in the specific object characteristic storage unit 22 or the common object characteristic storage unit 24 selected by the object characteristic selection unit 21a. In processing in step S8a, on the basis of the calibration information input at the calibration input unit 6, the object characteristic calibration unit 7 calibrates the parameter stored in the specific object characteristic storage unit 22 or the common object characteristic storage unit 24 selected by the object characteristic selection unit 21a, via the object characteristic selection unit 21a.

In the detection apparatus 20e, it is also possible to store, in the common object characteristic storage unit 24, a parameter based on the results of calibration performed based on all past calibration information and, from a certain point of time, allow the specific object characteristic storage units 22 to store parameters resulting from repeated execution of the crack detection processing for specific objects to be inspected, such as tunnels, on the basis of a copy of the parameter stored in the common object characteristic storage unit 24. In detecting an abnormal object such as a crack, the detection apparatus 20e selects either a parameter stored in the specific object characteristic storage unit 22 or a parameter stored in the common object characteristic storage unit 24. The detection apparatus 20e normally selects one of the specific object characteristic storage units 22 that matches the condition, and selects the common object characteristic storage unit 24 when none of the specific object characteristic storage units 22 matches the condition.

In the object characteristic storage device 2a in the above-described tenth embodiment, the plurality of specific object characteristic storage units 22 are used for different tunnels or structures. Meanwhile, it is imaginable that all of the parameters in the specific object characteristic storage units 22 are converge to the same value as the parameters are calibrated through repeated inspections. Thus, in the object characteristic storage device 2b in the eleventh embodiment, the parameters stored in the specific object characteristic storage units 22 and having their values converged may be stored as a common parameter in the common object characteristic storage unit 24.

As described above, according to the present embodiment, the detection apparatus 20e has, in addition to the plurality of specific object characteristic storage units 22, the common object characteristic storage unit 24 that stores as various parameters the characteristics of abnormal objects for all objects to be inspected. Thus, regarding an object that is to be inspected for the first time, a parameter stored in the common object characteristic storage unit 24 can be used to start the inspection because, for example, none of the specific object characteristic storage units 22 stores the characteristic of such an object. When the parameter is updated as a result of performing a plurality of times of the inspection, the updated parameter can be newly stored in the specific object characteristic storage unit 22.

Figure 15:
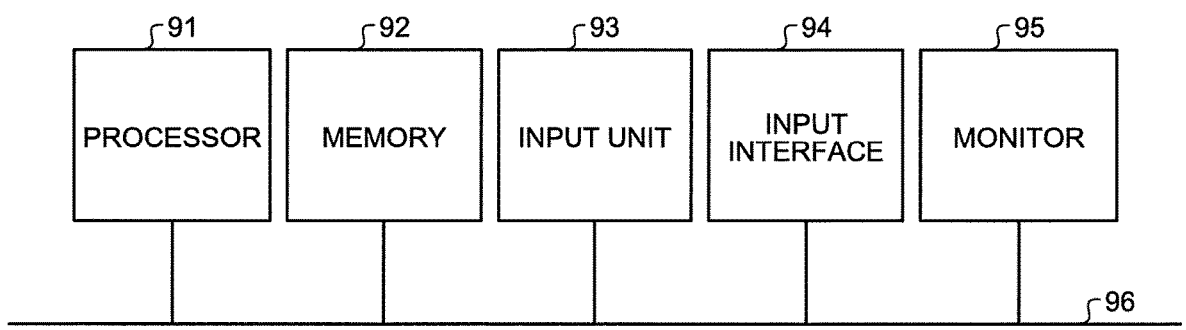
FIG. 15 is a diagram illustrating a hardware configuration example of the detection apparatuses according to the first to eleventh embodiments.

A hardware configuration implementing the components in the block diagram of the detection apparatus 20 illustrated in FIG. 1 will be described. FIG. 15 is a diagram illustrating a hardware configuration example of the detection apparatuses according to the first to eleventh embodiments. In the detection apparatus 20 of FIG. 1, the image information input unit 1 is implemented by an input unit 93 such as a digital camera, a data reader that reads data, or a communication device. The object characteristic storage device 2 and the object storage unit 4 are implemented by a memory 92. The object detection unit 3 and the object characteristic calibration unit 7 are implemented by a processor 91 executing programs for their configurations stored in the memory 92. The object display unit 5 is implemented by the processor 91 executing a program for the object display unit 5 stored in the memory 92, together with a monitor 95. The calibration input unit 6 is implemented by the processor 91 executing a program for the calibration input unit 6 stored in the memory 92, together with an input interface 94. The processor 91, the memory 92, the input unit 93, the input interface 94, and the monitor 95 are connected by a system bus 96. In the detection apparatus 20, a plurality of processors 91 and a plurality of memories 92 may cooperate to perform the functions of the components illustrated in the block diagram in FIG. 1. Although the detection apparatus 20 can be implemented by the hardware configuration illustrated in FIG. 15, the detection apparatus 20 can be implemented by either software or hardware.

Although the detection apparatus 20 illustrated in FIG. 1 has been described, the detection apparatuses 20a to 20e in the other embodiments can also be implemented by the hardware configuration example illustrated in FIG. 15. In the detection apparatus 20a illustrated in FIG. 3, the object characteristic calibration unit 7a is implemented by the processor 91 executing a program for the object characteristic calibration unit 7a stored in the memory 92. The calibration history storage unit 8 is implemented by the memory 92. In the detection apparatus 20b illustrated in FIG. 4, the object display unit 5a is implemented by the processor 91 executing a program for the object display unit 5a stored in the memory 92, together with the monitor 95. The image information storage unit 9 is implemented by the memory 92. In the detection apparatus 20c illustrated in FIG. 5, the object display unit 5b is implemented by the processor 91 executing a program for the object display unit 5b stored in the memory 92, together with the monitor 95. The inspection result storage unit 10 is implemented by the memory 92. In the detection apparatus 20d illustrated in FIG. 12, the object characteristic selection unit 21 is implemented by the processor 91 executing a program for the object characteristic selection unit 21 stored in the memory 92. The specific object characteristic storage units 22 are implemented by the memory 92. The specific condition input unit 23 is implemented by the input interface 94. In the detection apparatus 20e illustrated in FIG. 14, the object characteristic selection unit 21a is implemented by the processor 91 executing a program for the object characteristic selection unit 21a stored in the memory 92. The common object characteristic storage unit 24 is implemented by the memory 92.

The configurations illustrated in the above embodiments illustrate an example of the subject matter of the present invention, and can be combined with another known art, and can be partly omitted or changed without departing from the scope of the present invention.

REFERENCE SIGNS LIST 1 image information input unit; 2, 2a, 2b object characteristic storage device; 3, 3a object detection unit; 4 object storage unit; 5, 5a, 5b object display unit; 6 calibration input unit; 7, 7a object characteristic calibration unit; 8 calibration history storage unit; 9 image information storage unit; 10 inspection result storage unit; 21, 21a object characteristic selection unit; 22 specific object characteristic storage unit; 23 specific condition input unit; 24 common object characteristic storage unit; 20, 20a, 20b, 20c, 20d, 20e detection apparatus.

The invention claimed is:

1. A detection apparatus comprising:
a processor; and
a memory to store a parameter indicating a characteristic of an abnormal object, wherein the memory stores a program to be executed by the processor to:
   detect an abnormal object candidate from image information by using the parameter, and store the detected abnormal object candidate in the memory, wherein the image information is based on an image captured by an image capturing device;
   display the abnormal object candidate stored in the memory;
   receive input of calibration information on the abnormal object candidate, and, on a basis of the calibration information, correct the abnormal object candidate stored in the memory; and
   calibrate the parameter stored in the memory, on the basis of the received calibration information,
wherein the memory stores an inspection result of an inspection, (i) said inspection is a technique different from the detection of the abnormal object candidate and does not rely on image information based on any image, and (ii) the inspection result indicates an abnormal location, and
wherein the program is executed by the processor to acquire information on the abnormal location and to detect the abnormal object candidate from the image information in an area outside the abnormal location indicated by the inspection result stored in the memory.

2. The detection apparatus according to claim 1, wherein when a plurality of pieces of calibration information on an identical abnormal object candidate is input to the detection apparatus, the calibration information is determined by majority decision.

3. The detection apparatus according to claim 1, wherein the memory stores a calibration history that is a history of calibration based on the calibration information, and the program is executed by the processor to calibrate the parameter stored in the memory, by using the received calibration information, and the calibration history stored in the memory.

4. The detection apparatus according to claim 1, wherein the memory stores the image information, and the program is executed by the processor to display the abnormal object candidate stored in the memory, and the image information stored in the memory, with the abnormal object candidate and the image information being superposed on each other.

5. The detection apparatus according to claim 1, wherein the program is executed by the processor to project and display the abnormal object candidate stored in the memory or an image in which the abnormal object candidate and the inspection results are superimposed on each other and displayed.

6. The detection apparatus according to claim 1, wherein the program is executed by the processor to make correction to add or delete an abnormal object to or from the abnormal object candidate stored in the memory, on the basis of the calibration information.

7. The detection apparatus according to claim 1, wherein the program is executed by the processor to make correction to combine a plurality of abnormal object candidates stored in the memory into one abnormal object candidate, or dividing one abnormal object candidate into a plurality of abnormal object candidates, on the basis of the calibration information.

8. The detection apparatus according to claim 1, wherein the memory includes a plurality of memories in which different parameters are stored and, wherein the program is executed by the processor to:
   select one of the plurality of memories;
   detect an abnormal object candidate from image information by using a parameter stored in the selected memory; and
   calibrate the parameter stored in the selected memory.

9. A detection apparatus comprising:
a processor; and
a memory to store a parameter indicating a characteristic of an abnormal object, wherein the memory stores a program to be executed by the processor to:
   detect an abnormal object candidate from image information by using the parameter, and store the detected abnormal object candidate in the memory, wherein the image information is based on an image captured by an image capturing device;

display the abnormal object candidate stored in the memory;

receive input of calibration information on the abnormal object candidate, and, on a basis of the calibration information, correct the abnormal object candidate stored in the memory; and calibrate the parameter stored in the memory, on the basis of the received calibration information, wherein the memory stores an inspection result of an inspection, (i) said inspection is a technique different from the detection of the abnormal object candidate and does not rely on image information based on any image, and (ii) the inspection result indicates an abnormal location, and wherein the program is executed by the processor to change a value of the parameter and use the parameter having the changed value to detect the abnormal object candidate from the image information within the abnormal location indicated by the inspection result stored in the memory.

10. The detection apparatus according to claim 9, wherein when a plurality of pieces of calibration information on an identical abnormal object candidate is input to the detection apparatus, the calibration information is determined by majority decision.

11. The detection apparatus according to claim 9, wherein the memory stores a calibration history that is a history of calibration based on the calibration information, and the program is executed by the processor to calibrate the parameter stored in the memory, by using the received calibration information, and the calibration history stored in the memory.

12. The detection apparatus according to claim 9, wherein the memory stores the image information, and the program is executed by the processor to display the abnormal object candidate stored in the memory, and the image information stored in the memory, with the abnormal object candidate and the image information being superposed on each other.

13. The detection apparatus according to claim 9, wherein the program is executed by the processor to project and display the abnormal object candidate stored in the memory or an image in which the abnormal object candidate and the inspection results are superimposed on each other and displayed.

14. The detection apparatus according to claim 9, wherein the program is executed by the processor to make correction to add or delete an abnormal object to or from the abnormal object candidate stored in the memory, on the basis of the calibration information.

15. The detection apparatus according to claim 9, wherein the program is executed by the processor to make correction to combine a plurality of abnormal object candidates stored in the memory into one abnormal object candidate, or dividing one abnormal object candidate into a plurality of abnormal object candidates, on the basis of the calibration information.

16. The detection apparatus according to claim 9, wherein the memory includes a plurality of memories in which different parameters are stored, wherein the program is executed by the processor to:
select one of the plurality of memories;
detect an abnormal object candidate from image information by using a parameter stored in the selected memory; and
calibrate the parameter stored in the selected memory.

17. A detection apparatus comprising:
a processor; and
a memory to store a parameter indicating a characteristic of an abnormal object, wherein the memory stores a program to be executed by the processor to:
detect an abnormal object candidate from image information by using the parameter, and store the detected abnormal object candidate in the memory, wherein the image information is based on an image captured by an image capturing device;
display the abnormal object candidate stored in the memory;
receive input of calibration information on the abnormal object candidate, and, on a basis of the calibration information, correct the abnormal object candidate stored in the memory; and
calibrate the parameter stored in the memory, on the basis of the received calibration information, wherein when a plurality of pieces of calibration information on an identical abnormal object candidate is input to the detection apparatus, the calibration information is determined on the basis of ratios of areas of the abnormal object candidate indicated by the pieces of the calibration information, wherein the memory stores an inspection result of an inspection, (i) said inspection is a technique different from the detection of the abnormal object candidate and does not rely on image information based on any image, and (ii) the inspection result indicates an abnormal location, and wherein the program is executed by the processor to display the abnormal object candidate stored in the memory, and the inspection result stored in the memory, with the abnormal object candidate and the abnormal location being superimposed on each other.

18. The detection apparatus according to claim 17, wherein the memory stores a calibration history that is a history of calibration based on the calibration information, and
the program is executed by the processor to calibrate the parameter stored in the memory, by using the received calibration information, and the calibration history stored in the memory.

19. The detection apparatus according to claim 17, wherein the memory stores the image information, and
the program is executed by the processor to display the abnormal object candidate stored in the memory, and the image information stored in the memory, with the abnormal object candidate and the image information being superposed on each other.

20. The detection apparatus according to claim 17, wherein the program is executed by the processor to project and display the abnormal object candidate stored in the memory or an image in which the abnormal object candidate and the inspection result are superimposed on each other and displayed.

21. The detection apparatus according to claim 17, wherein
    the program is executed by the processor to make correction to add or delete an abnormal object to or from the abnormal object candidate stored in the memory, on the basis of the calibration information.

22. The detection apparatus according to claim 17, wherein
    the program is executed by the processor to make correction to combine a plurality of abnormal object candidates stored in the memory into one abnormal object candidate, or dividing one abnormal object candidate into a plurality of abnormal object candidates, on the basis of the calibration information.

23. The detection apparatus according to claim 17, wherein
    the memory includes a plurality of memories in which different parameters are stored, wherein
    the program is executed by the processor to:
        select one of the memories;
        detect an abnormal object candidate from image information by using a parameter stored in the selected memory; and
        calibrate the parameter stored in the selected memory.

* * * * *